(12) United States Patent
Geiss et al.

(10) Patent No.: US 8,411,962 B1
(45) Date of Patent: Apr. 2, 2013

(54) ROBUST IMAGE ALIGNMENT USING BLOCK SUMS

(75) Inventors: Ryan Geiss, Mountain View, CA (US); Marc Levoy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/458,334

(22) Filed: Apr. 27, 2012

Related U.S. Application Data

(63) Continuation of application No. 13/305,389, filed on Nov. 28, 2011, now Pat. No. 8,200,020.

(51) Int. Cl.
*G06K 9/46* (2006.01)

(52) U.S. Cl. ........................................................ 382/190

(58) Field of Classification Search .................. 382/190, 382/195, 197, 294; 396/128; 348/142
See application file for complete search history.

(56) References Cited

U.S. PATENT DOCUMENTS

| | | | |
|---|---|---|---|
| 7,239,805 B2 | 7/2007 | Uyttendaele et al. | |
| 2009/0231449 A1 | 9/2009 | Tzur et al. | |
| 2009/0244301 A1 | 10/2009 | Border et al. | |
| 2009/0322901 A1 | 12/2009 | Subbotin et al. | |
| 2010/0165075 A1 | 7/2010 | Chou et al. | |
| 2012/0002899 A1 | 1/2012 | Orr, IV et al. | |
| 2012/0127348 A1 | 5/2012 | Li | |

FOREIGN PATENT DOCUMENTS

| | | |
|---|---|---|
| WO | 98/02844 | 1/1998 |
| WO | 2011/102850 | 8/2011 |
| WO | 2012/039669 | 3/2012 |
| WO | 2012/110894 | 8/2012 |

*Primary Examiner* — Claire X Wang
*Assistant Examiner* — Shervin Nakhjavan
(74) *Attorney, Agent, or Firm* — McDonnell Boehnen Hulbert & Berghoff LLP

(57) ABSTRACT

A computing device may select a source tile from a source image. From the source tile, the computing device may select a first rectangular feature and a second rectangular feature. Based on the first and second rectangular features, the computing device may calculate a source feature vector. The computing device may also select a search area of a target image, and a target tile within the within the search area. Based on the target tile, the computing device may calculate a target feature vector. The computing device may determine that a difference between the source feature vector and the target feature vector is below an error threshold, and based on this determination, further determine a mapping between the source image and the target image. The computing device may then apply the mapping to the source image to produce a transformed source image.

20 Claims, 22 Drawing Sheets

ROBUST IMAGE ALIGNMENT USING BLOCK SUMS

CROSS-REFERENCE TO RELATED APPLICATIONS

The present application claims priority to U.S. patent application Ser. No. 13/305,389, filed on Nov. 28, 2011 and herein incorporated by reference in its entirety.

BACKGROUND

A large number of applications for manipulating the output of still and video cameras involve the alignment of two or more images. For instance, by manipulating multiple low-quality exposures of a still camera photo, a higher-quality photo can be formed. However, existing image alignment techniques tend to lack either computational efficiency or robustness.

SUMMARY

In an example embodiment, a computing device may select a source tile from a source image. The source tile may be represented by a source m×n rectangle that contains m×n pixels, and each of the m×n pixels may be represented by one or more pixel values. The computing device may select a first rectangular feature and a second rectangular feature in the source tile. Both the first and second rectangular features may be smaller than the source m×n rectangle in at least one dimension, and at least one of the first and second rectangular features may be 2×2 pixels or larger.

The computing device may calculate a source feature vector, where the source feature vector comprises (i) a first entry containing a first pixel value sum of the first rectangular feature in the source tile, and (ii) a second entry containing a second pixel value sum of the second rectangular feature in the source tile. The computing device may also select a search area of a target image. The search area may be represented by an m'×n' rectangle that contains m'×n' pixels, and each of the m'×n' pixels may be represented by one or more pixel values. The m'×n' rectangle may be larger than the source m×n rectangle in at least one dimension. Additionally, the computing device may select a target tile within the m'×n' rectangle, where the target tile contains m×n pixels.

The computing device may also select a first rectangular feature and a second rectangular feature in the target tile. The first and second rectangular features in the target tile may be based on the first and second rectangular features in the source tile.

The computing device may further calculate a target feature vector. The target feature vector may comprise (i) a first entry containing a first pixel value sum of the first rectangular feature in the target tile, and (ii) a second entry containing a second pixel value sum of the second rectangular feature in the target tile. The computing device may determine that a difference between the source feature vector and the target feature vector is below an error threshold. Based on the difference between the source feature vector and the target feature vector being below the error threshold, the computing device may determine a mapping between the source image and the target image. The computing device may apply the mapping to the source image to produce an aligned source image, or the computing device may apply the mapping to the target image to produce an aligned target image.

In another example embodiment, a server device may receive a source feature vector. In response to receiving the source feature vector, the server device may select a search area from a target image. The search area may be represented by an m'×n' rectangle that contains m'×n' pixels, where each of the m'×n' pixels is represented by one or more pixel values.

The server device may select a target tile from the search area. The target tile may be represented by a target m×n rectangle that contains m×n pixels, and where the m'×n' rectangle is larger than the target m×n rectangle in at least one dimension. The server device may select a first rectangular feature and a second rectangular feature in the target tile, where both the first and second rectangular features may be smaller than the target m×n rectangle in at least one dimension, and at least one of the first and second rectangular features may be 2×2 pixels or larger.

The server device may calculate a target feature vector, where the target feature vector comprises (i) a first entry containing a first pixel value sum of the first rectangular feature in the target tile, and (ii) a second entry containing a second pixel value sum of the second rectangular feature in the target tile. The server device may determine that a difference between the source feature vector and the target feature vector is below an error threshold. Based on the difference between the source feature vector and the target feature vector being below the error threshold, the server device may transmit, to the client device, an indication of the target image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
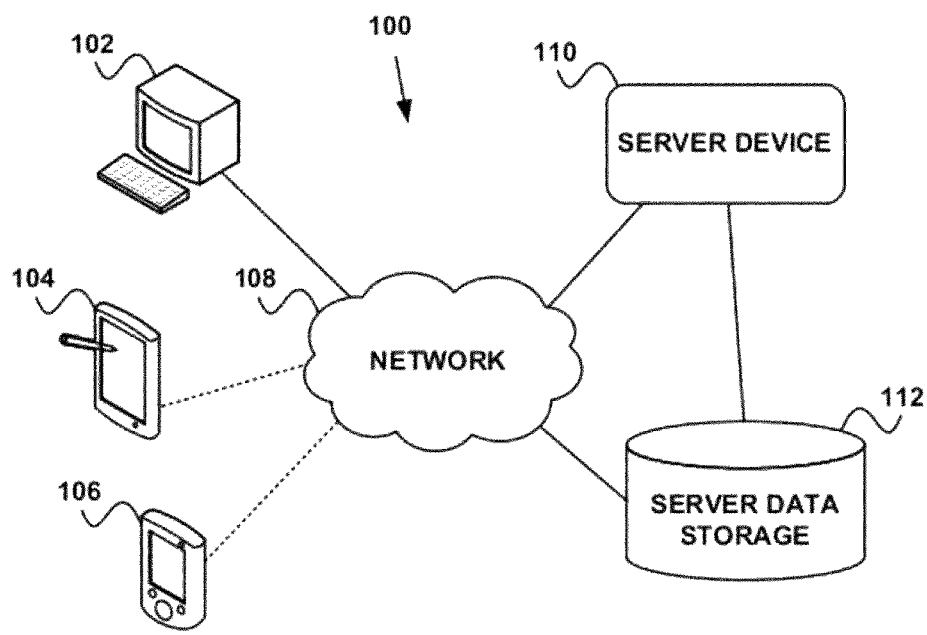
FIG. 1 depicts a distributed computing architecture, in accordance with an example embodiment.

Generally speaking, image alignment may involve computational methods for arranging two or more images from a still or video camera over one another so that they "match." Once the images are aligned, various functions can be performed, such as image enhancement (e.g., noise reduction), image stabilization (e.g., to compensate for the shaking of a video camera), pattern matching (e.g., identification of common elements in two or more images), and object recognition (e.g., finding a specific object in two or more images), as well as other functions.

As an example of image enhancement, two digital photographs may be taken from slightly different angles of, say, a teacup. However, the process of taking the capturing and digitizing these images may introduce noise (e.g., Gaussian noise) to the resulting digital photographs. In order to produce a final image of the teacup with at least some of the noise removed, a composite image can be formed by processing the digital photographs so that the respective representations of the teacup in each are combined with one another. In order to perform this compositing of the respective representations of the teacup, it may be advantageous to first align these representations with one another.

As an example of image stabilization, a hand-held video camera may be used to record a sequence of images of, say, a soccer ball in flight. However, if the user of the hand-held camera has shaky hands, the resulting video sequence may exhibit frame-to-frame jitter. In order to reduce this jitter, the location of soccer ball within two or more of these images can be matched. Then, video sequence can be adjusted to compensate for the jitter, and make the soccer ball appear to move in a smooth arc. However, the embodiments herein can also be applied to static scenes in which there is little or no movement.

Further, these embodiments can be combined with other forms of image alignment. For example, some cameras include gyroscopes, and encode gyroscope data along with images, the data representing the relative position of the camera when each respective image was taken. A coarse level of image alignment can be performed by adjusting the positions of these images according to their respective gyroscope data, then the embodiments herein can be applied to perform a finer level of image alignment.

Given the various uses of image alignment, it is advantageous to be able to perform image alignment in an efficient and robust fashion. In practice, more than a simple global alignment (i.e., translating the whole image by a number of pixels on the x-axis and by a potentially different number of pixels on the y-axis) is usually performed. Therefore, instead of aligning the whole image according to one offset, it may be advantageous to break the image into a number of smaller tiles, and align each tile separately according to respective individual offsets. The result might be that some tiles are offset differently than others.

Given this tile-based approach, a brute-force algorithm to determine such an offset for a given tile of a first, or "source," image is to try each possible movement or "translation" of the given tile to a corresponding position in a second, or "target," image. For each attempted alignment of tiles, the net difference between all pixels in the translated source image and the target image may be determined and summed. This net difference or "error" is stored, and the translation with the minimum error can be classified as the "best fit."

Trying all translations in this fashion can be computationally expensive. For example, if each tile is of size m×n, it will take on the order of $m^2n^2$ (m squared times n squared) operations per tile to determine the best fit. As a numerical example, if m and n are both 64, $m^2n^2=16,772,216$.

Improvements may be made to the brute-force algorithm. For instance, the algorithm can be enhanced by summing pixel values on a per-column basis for both the tile in the source image and an equivalent portion of the target image. These column-based sums may be stored in respective vectors for the source image and the target image. Similarly, pixel values can be summed on a per-row basis both for the tile in the source image and for a portion of the target image corresponding to the tile. These row-based sums may also be stored in respective vectors.

An error can be computed based on, e.g., taking the sum of the squared difference between each respective element of the source and target vectors. In some cases, before taking the error, the vectors may be "shifted" or "slid" into various positions relative to one another, and the error of each of these positions may be determined. The lowest of these errors may be considered the best-fit error.

This best-fit error represents an estimated quality of the alignment between the tile from the source image and portion of the target image. The lower the best-fit error, the better the estimated alignment quality. This optimization can be performed using on the order of mn operations. Therefore, if m and n are both 64, this process will take on the order of 4096 operations.

This column- and row-based optimization, however, can provide inaccurate results. For example, if the image is of the letter X or of a checkerboard pattern, the row and column sums will provide a uniform result. Thus the resulting alignment between the source and target images is often inaccurate.

Computationally efficient and robust determination of tile alignments permits both more widespread use of image alignment and determination of alignments for more tiles at the same computational cost. Additionally, computationally efficient and robust tile alignment can, in turn, lead to use of computationally efficient and robust algorithms for image alignment. For instance a relatively large number of tile alignments for tiles from the image can be determined, and the image alignment may be based on these tile alignments. Such techniques can lead to faster and better image alignments for a variety of applications that use image alignment.

2. Communication System and Device Architecture

The methods, devices, and systems described herein can be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
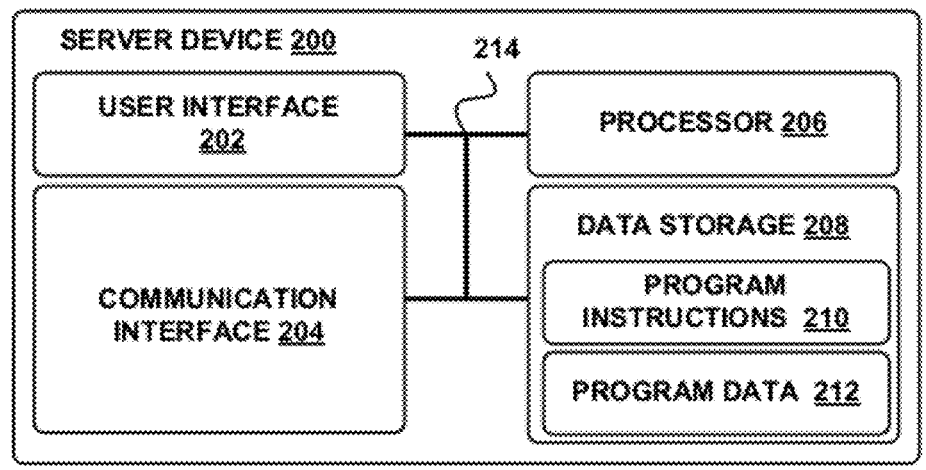
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 204 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
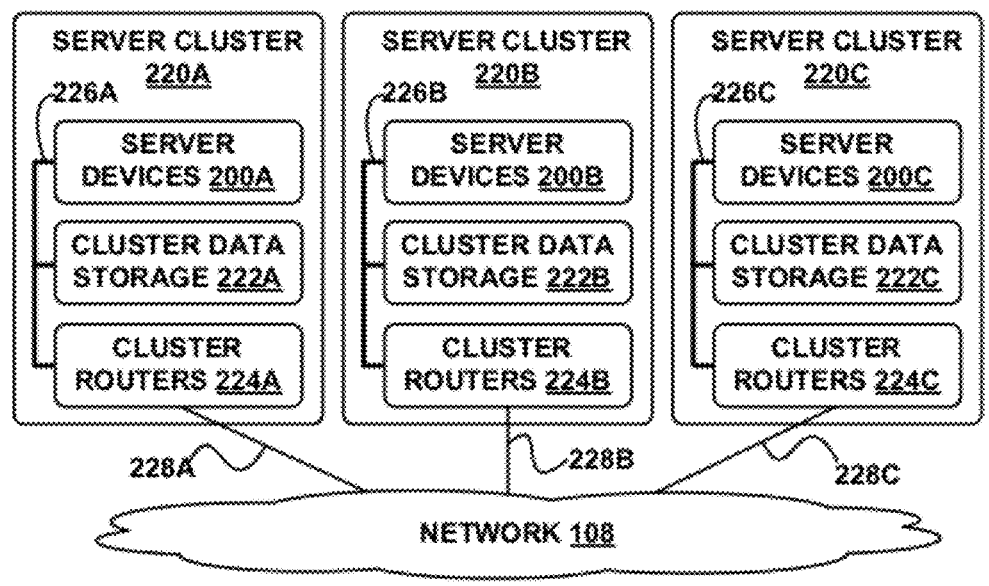
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220a, 220b, and 220c. Server cluster 220a may include one or more server devices 200a, cluster data storage 222a, and cluster routers 224a connected by a local cluster network 226a. Similarly, server cluster 220b may include one or more server devices 200b, cluster data storage 222b, and cluster routers 224b connected by a local cluster network 226b. Likewise, server cluster 220c may include one or more server devices 200c, cluster data storage 222c, and cluster routers 224c connected by a local cluster network 226c. Server clusters 220a, 220b, and 220c may communicate with network 108 via communication links 228a, 228b, and 228c, respectively.

In some embodiments, each of the server clusters 220a, 220b, and 220c may have an equal number of server devices, an equal number of cluster data storages, and an equal number of cluster routers. In other embodiments, however, some or all of the server clusters 220a, 220b, and 220c may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220a, for example, server devices 200a can be configured to perform various computing tasks of server device 110. In one embodiment, these computing tasks can be distributed among one or more of server devices 200a. Server devices 200b and 200c in server clusters 220b and 220c may be configured the same or similarly to server devices 200a in server cluster 220a. On the other hand, in some embodiments, server devices 200a, 200b, and 200c each may be configured to perform different functions. For example, server devices 200a may be configured to perform one or more functions of server device 110, and server devices 200b and server device 200c may be configured to perform functions of one or more other server devices. Similarly, the functions of server data storage device 112 can be dedicated to a single server cluster, or spread across multiple server clusters.

Cluster data storages 222a, 222b, and 222c of the server clusters 220a, 220b, and 220c, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220a, 220b, and 220c, various active portions and/or backup/redundant portions of these components can be distributed across cluster data storages 222a, 222b, and 222c. For example, some cluster data storages 222a, 222b, and 222c may be configured to store backup versions of data stored in other cluster data storages 222a, 222b, and 222c.

Cluster routers 224a, 224b, and 224c in server clusters 220a, 220b, and 220c, respectively, may include networking equipment configured to provide internal and external communications for the server clusters. For example, cluster routers 224a in server cluster 220a may include one or more packet-switching and/or routing devices configured to provide (i) network communications between server devices 200a and cluster data storage 222a via cluster network 226a, and/or (ii) network communications between the server cluster 220a and other devices via communication link 228a to network 108. Cluster routers 224b and 224c may include network equipment similar to cluster routers 224a, and cluster routers 224b and 224c may perform networking functions for server clusters 220b and 220c that cluster routers 224a perform for server cluster 220a.

Additionally, the configuration of cluster routers 224a, 224b, and 224c can be based at least in part on the data communication requirements of the server devices and cluster storage arrays, the data communications capabilities of the network equipment in the cluster routers 224a, 224b, and 224c, the latency and throughput of the local cluster networks 226a, 226b, 226c, the latency, throughput, and cost of the wide area network connections 228a, 228b, and 228c, and/or other factors that may contribute to the cost, speed, fault-tolerance, resiliency, efficiency and/or other design goals of the system architecture.

D. Client Device

Figure 3:
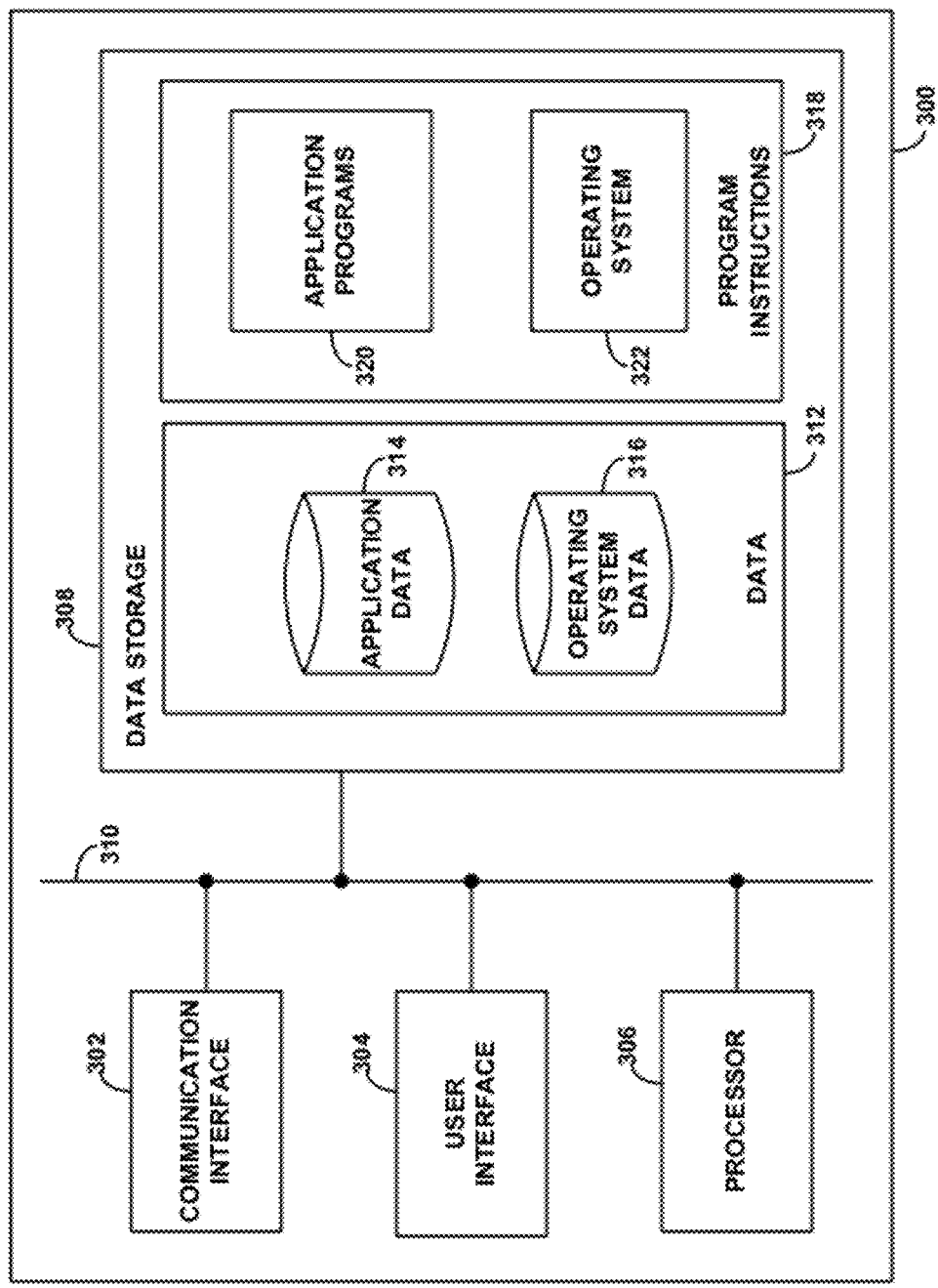
FIG. 3 depicts a block diagram of a client device in, accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a touch-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, if executed by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Image Alignment

Figure 4A:
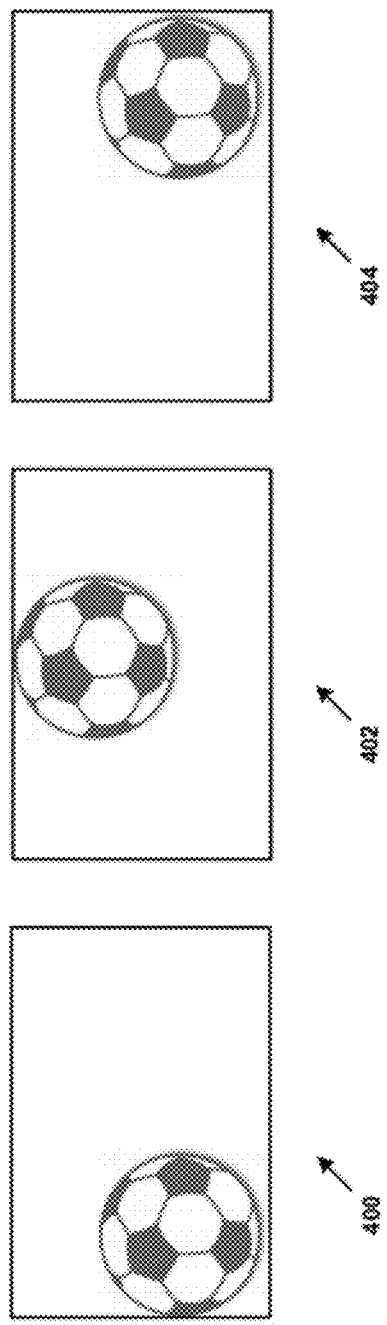
FIG. 4A depicts a set of images, each representing a common object, in accordance with an example embodiment.

FIG. 4A is a representation of three images. Each of these three images depicts a soccer ball, perhaps the same soccer ball in flight after being kicked. Thus, these images may have been taken as a series of still photographs of the soccer ball at various points in its trajectory. Alternatively, these images may be contiguous or non-contiguous frames of the soccer ball's flight as taken by a video camera. While in this example image 400 is of a soccer ball, image 400 could depict other types of objects, and the embodiments herein may be able to operate on these types of objects.

As can be seen in FIG. 4A, the soccer ball appears in the lower-left-hand corner of image 400, the upper-middle of image 402, and the lower-right-hand corner of image 404. The frame-to-frame location of the soccer ball may vary due to the soccer ball having been in motion while the photographs were taken, and/or the camera having been in motion. Thus, the image of the soccer ball may suffer from some form of distortion, such as blurring or jitter.

Regardless of exactly how the images came about, one possible goal of processing these images would be to enhance the image quality of the soccer ball. Alternatively or additionally, another goal of processing these images would be to remove the effect of camera motion. In order to perform image enhancement or image stabilization as discussed above, it is helpful to be able to align these images in an efficient manner.

Figure 4B:
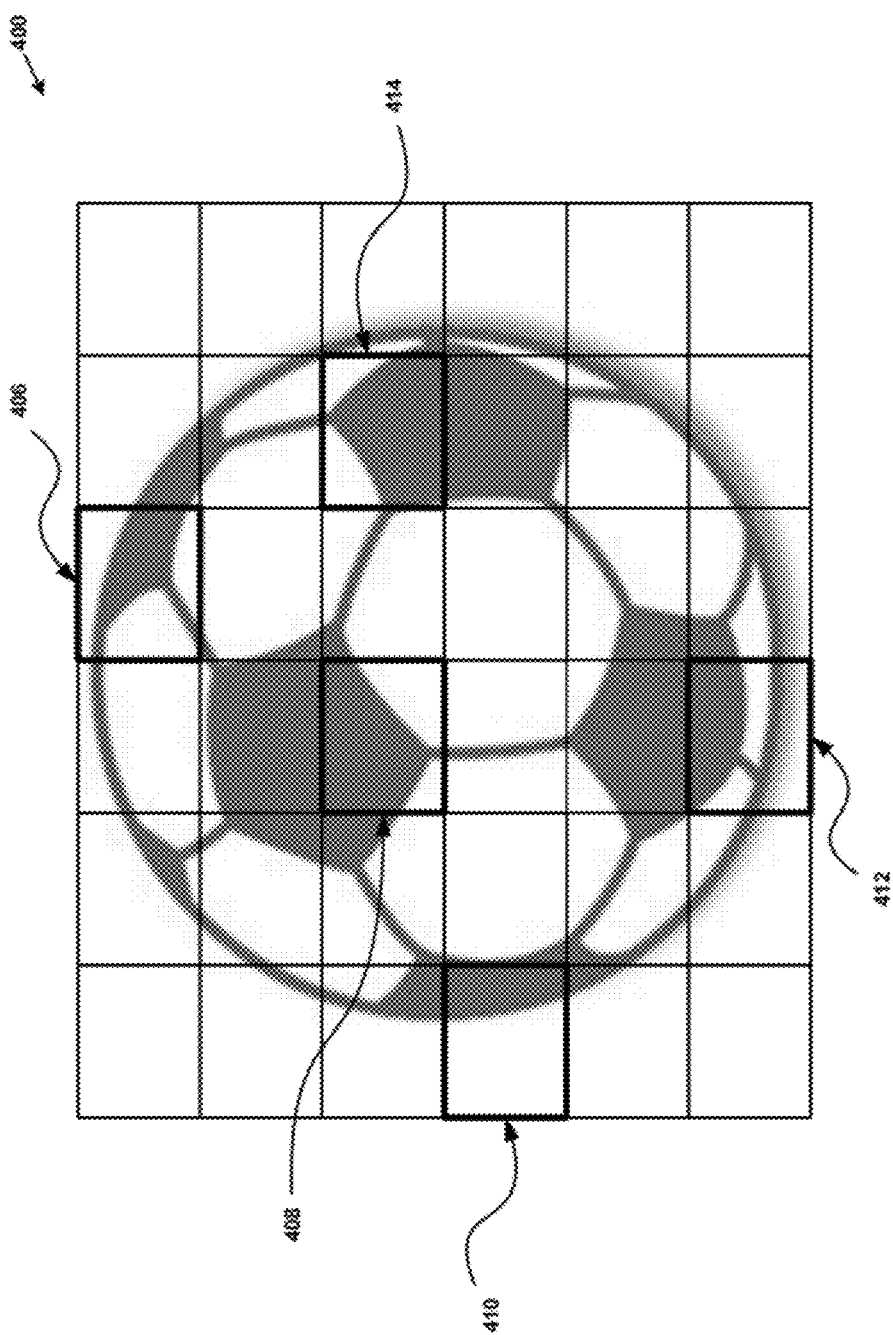
FIG. 4B depicts a source image, in accordance with an example embodiment.

FIG. 4B is a larger representation of an image 400. As noted above, image 400 could be a digital image captured from a still camera or video camera. Accordingly, image 400 may comprise a number of pixels that are arranged to represent the soccer ball.

For purposes of simplicity, image 400 is shown in black and white. Thus, in some embodiments, image 400 may be a "bitmap" with pixel values restricted to 0 and 1. In other embodiments, each pixel of image 400 can have one of three or more pixel values, each pixel value representing a color, such as red, green, and blue (RGB), cyan, magenta, yellow, and black (CYMK), or other values than colors, such as hue, saturation, and a brightness value (HSV). Each of the pixel values can be an integer, for example an integer in the range of [0, 1] for bit-maps, [0, 255] for RGB or HSV values, or some other range. In other examples, pixel values can be real valued; e.g., a real number in the range [0, 1].

Image 400 can be aligned with another image of the soccer ball, such as image 402 or image 404, for noise reduction or for other purposes. For purposes of clarity, and without loss of generality, image 400 will be referred to as the "source image" and the other image with which image 400 is aligned will be referred to as the "target image." As shown in FIG. 4A, The soccer ball in the target image may be offset to some degree compared to the source image. The soccer ball in the target image may also be captured from a different angle, scaled (increased or decreased in size), and/or rotated.

A. Tile Selection

To align the source and target images, image 400 may first be divided into a number of rectangular tiles, as shown in FIG. 4B. Each tile represents a portion of image 400 and contains a number of pixels. Some of these tiles may be compared to corresponding areas of the target image to align the images. In order to perform this comparison, a subset of tiles may be chosen from image 400, such as one or more of tiles 406, 408, 410, 412, and 414. While these tiles are rectangular in FIG. 4B, they may instead be square, or take on some other shape.

In some embodiments, tiles with the highest intra-tile variance may be chosen. Intra-tile variance may be determined as the variance (e.g., the mean squared deviation) computed over all of the pixels in the tile. For tiles with non-bitmap pixels (e.g., RGB, CYMK, or HSV encodings), variances can be calculated separately for each component (e.g., for RGB, separate variances can be calculated for the red, green and blue components). These separate variances may be weighted equally to determine a composite variance, or may be weighted based on human visibility (e.g., by scaling red by about 0.35, green by about 0.5, and blue by about 0.15) to determine the composite variance. Alternatively or additionally, intra-tile variance can be measured by subdividing a tile into a number (e.g., 4, 6, 9, etc.) of smaller regions and calculating the maximum difference of pixel values between any two of the regions.

Thus, tiles with a relatively uniform color, such as the four tiles in the corners of image 400, are likely to have a relatively low variance. But, tiles with a larger difference in color, such as tiles 406, 408, 410, 412, and 414, are likely to have a relatively high variance.

It should be noted that there are different ways of measuring the variance of a tile. For example, the average variance of a tile in the vertical direction and the average variance of a tile in the horizontal direction can be measured separately, and the minimum of the two taken to be the variance of the tile. Using this alternative calculation of variance helps eliminate tiles with high variance in one direction and low variance in the other direction. These tiles could be difficult to align in the low-variance direction, and therefore might decrease the accuracy of the overall alignment.

It may be preferable to use high-variance tiles for image alignment, as these tiles tend to have more distinct features than low-variance tiles. For instance, each of the corner tiles of image 400 are very similar to one another, while tiles 406, 408, 410, 412, and 414 each exhibit features that no other tile in image 400 exhibits. Therefore, one or more high-variance tiles may be chosen from image 400 for comparison to the target image. In some embodiments, the n tiles with the highest variance may be chosen, where n could be 1, 2, 3, 5, 10, and so on. In other embodiments, p % of the tiles with the highest variance may be chosen, where p could be 1, 5, 10, 20, etc.

It should be understood that metrics other than variance can be used to select tiles from image 400. For example, standard deviations, inter-quartile ranges, or other ways of calculating or estimating variability may be used in place of or along with variance. Furthermore, in practice, square tiles may be chosen. However, the examples herein utilize rectangular tiles in order to illustrate how the embodiments operate in a more general sense.

It should also be understood that, prior to tile selection, the images may be pre-processed with a high-pass filter. The result of this pre-processing may serve to detect and/or accentuate the edges of objects within the images, thereby making the alignment less sensitive to brightness levels, color saturation, etc. Instead, the alignment may focus on the two-dimensional structure of the edges in the image. This pre-processing can provide better results in some use cases, such as when trying to align two images at different exposures.

To summarize, the tile selection process may be expressed algorithmically, in high-level pseudo-code, as shown in Table 1.

TABLE 1

Figure 5:
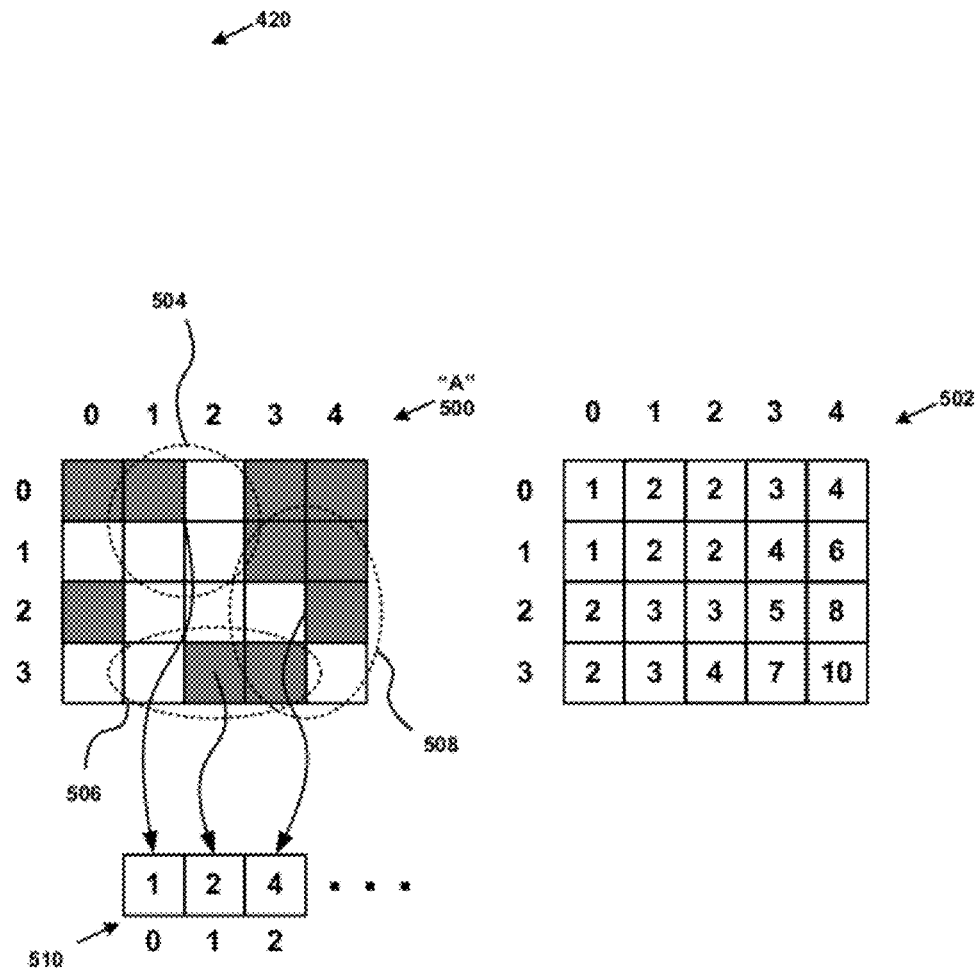
FIG. 5 depicts a tile from a source image and a summed area table for the tile, in accordance with an example embodiment.

1. Divide source image into tiles
2. Determine variance of at least some of the tiles
3. Select some of the tiles with the highest variance B. Tile Processing Once tiles are selected from image 400, each of these tiles may be processed for comparison with portions of the target image. In FIG. 5, tile "A" 500 is a pixel-level example of a tile from a source image. For purposes of illustration, tile "A" 500 does not correspond to any of the tiles in FIG. 4B. Instead, it is a simplified representation of a 5×4 pixel tile. In general, the techniques discussed herein can operate on tiles that are smaller than tile "A" 500 (e.g., 2×2 pixel tiles), as well as tiles that are larger than tile "A" 500 (e.g., 256×128 pixels).

Each pixel in tile "A" 500 is either white or shaded, to represent bitmap values of 0 and 1, respectively. Accordingly, tile "A" 500 can be thought of as a 5×4 matrix, wherein each cell in the matrix takes on a value of either 0 or 1 (for non-bitmap image, each cell in the matrix may take on values other than 0 and 1). These cells can be addressed using row and column coordinates. For example, the upper-left-hand corner of tile "A" 500 is designated as column 0, row 0, or coordinates (0, 0), the lower-right-hand corner of tile "A" 500 is at column 4, row 3, or coordinates (4, 3). (Any rectangle can be unambiguously identified by specifying the coordinates of its upper-left-hand corner and lower-right-hand corner.) Generally, the pixel in column c, row r of tile "A" 500 can be referenced with coordinates (c, r).

In tile "A" 500, a number of "feature rectangles" can be selected. Each feature rectangle is a sub-rectangle of tile "A" 500. These feature rectangles are chosen to represent the pixel characteristics of tile "A" 500. Thus, any number of feature rectangles can be chosen from any part of tile "A" 500. In some embodiments, these feature rectangles may be chosen randomly. Alternatively or additionally, the feature rectangles may be chosen so that their respective sizes (i.e., the number of pixels comprising each feature rectangle) is substantially evenly distributed.

In FIG. 5, three feature rectangles are identified. Feature rectangle 504 is defined by having an upper-left-hand corner at coordinates (1, 0) and a lower-right-hand corner at coordinates (2, 1). Feature rectangle 506 is defined by having an upper-left-hand corner at coordinates (1, 3) and a lower-right-hand corner at coordinates (3, 3). Feature rectangle 508 is defined by having an upper-left-hand corner at coordinates (3, 1) and a lower-right-hand corner at coordinates (4, 3).

The sum of values in the cells for each feature rectangle is calculated and stored in feature vector 510. This sum may be referred to as a "pixel value sum." Since tile "A" 500 is from a bitmap image, the pixel value sum is a count of the number of shaded pixels in each feature rectangle. Thus, for feature rectangle 504, feature vector 510 at position 0 contains a 1, for feature rectangle 506, feature vector 510 at position 1 contains a 2, and for feature rectangle 508, feature vector 510 at position 2 contains a 4. If there are more than three feature rectangles defined, feature vector 510 may contain additional positions. Formally, where feature vector V at position k corresponds to a feature rectangle, $FR_k$, having an upper-left-hand corner at coordinates (c1, r1) and a lower-right-hand corner at coordinates (c2, r2), $$V(k) = \sum_{c=c1}^{c2} \sum_{r=r1}^{r2} FR_k(c, r)$$

In order to reduce the extent of computation used to calculate feature vectors, a summed area table (SAT) may be pre-calculated for tile "A" 500. Formally, an SAT of an m×n tile X can be defined as $$SAT(X, a, b) = \sum_{r=0}^{b} \sum_{c=0}^{a} X(c, r)$$

Thus, SAT(A, a, b) represents the sum of all pixels in sub-rectangle defined by the upper-left-hand corner at coordinates (0, 0) and the lower-right-hand corner at coordinates (a, b) in tile "A" 500. Accordingly, in FIG. 5, SAT 502 is the SAT for tile "A" 500. SAT 502 may be derived from an SAT for a larger portion of the source image or the entire source image.

An SAT for a given m×n tile can be calculated in order mn operations; that is, O(mn) in "big-O" notation. One way of doing so, in a recursive fashion, is to take advantage of the summed area table property that $$SAT(X,c,r)=X(c,r)+SAT(X,c-1,r)+SAT(X,c,r-1)-SAT(X,c-1,r-1)$$

Where the value of tile X at any negative row or column index is assumed to be zero. In an alternate embodiment, negative row and column indices can be avoided by enlarging tile X to be (m+1)×(n+1) by appending a column of zeros to the left of tile X and a row of zeros at the top of tile X.

This summed area table property can also be used to compute the pixel value sum of a feature rectangle (i.e., the value of a cell in the feature vector) in constant time. An illustration of this computation is shown in FIG. 6.

The pixel value sum, P(X, c1, r1, c2, r2), of a given feature rectangle of tile X defined by the upper-left-hand corner at coordinates (c1, r1) and the lower-right-hand corner at coordinates (c2, r2) can be found by:
  a. Starting with the pixel value sum of the rectangle defined by the upper-left-hand corner at coordinates (0, 0) and the lower-right-hand corner at coordinates (c2, r2),
  b. Subtracting the sum of the pixels in the rectangle defined by the upper-left-hand corner coordinates (0, 0) and the lower-right-hand corner coordinates (c2, r2-1), as shown in table 600,
  c. Subtracting the sum of the pixels in the rectangle defined by the upper-left-hand corner coordinates (0, 0) and the lower-right-hand corner coordinates (c1-1, r1), as shown in table 602, and
  d. Adding the sum of the pixels in the rectangle defined by the upper-left-hand corner coordinates (0, 0) and the lower-right-hand corner coordinates (c1-1, r1-1), as shown in table 604.

Again, the value at any negative row or column index is assumed to be zero.

Figure 6:
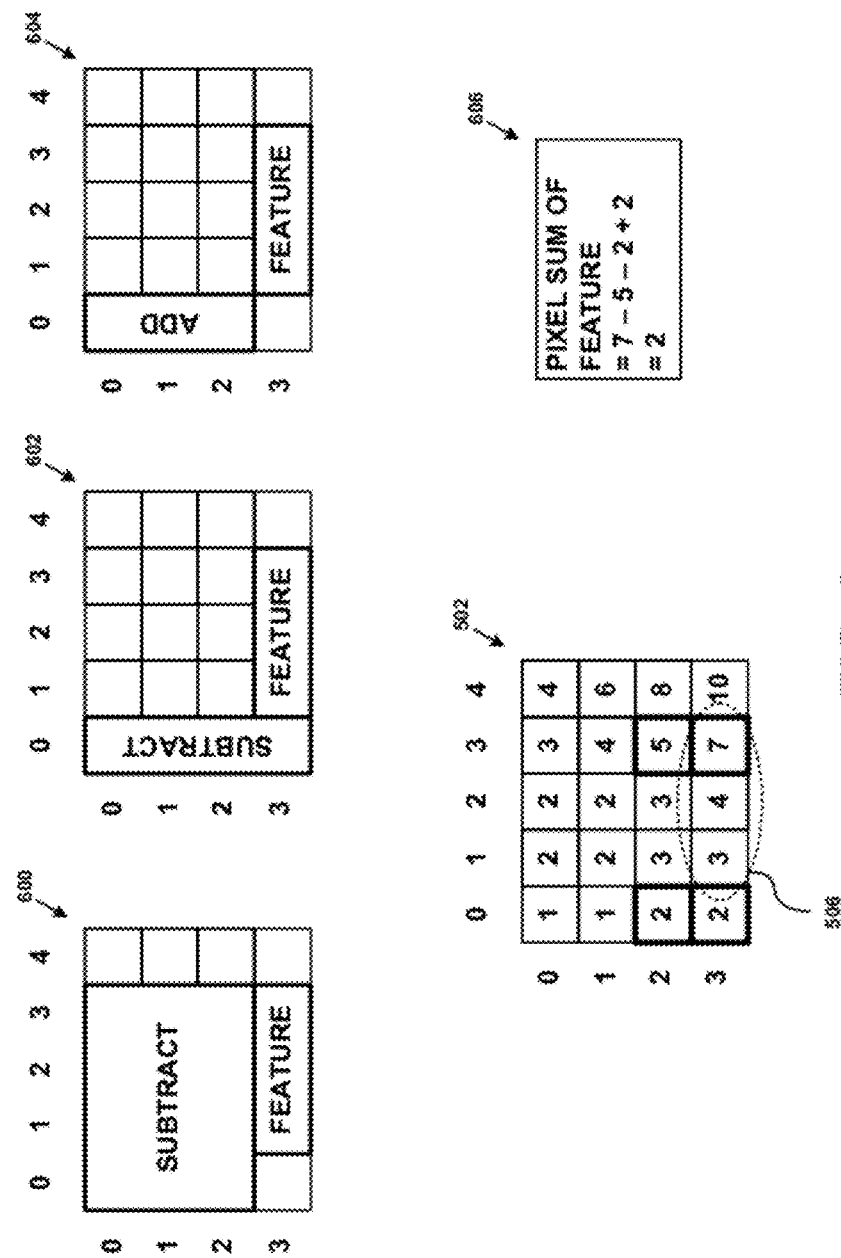
FIG. 6 depicts the pixel value sum of a feature rectangle being calculated based on an associated summed area table, in accordance with an example embodiment.

As shown in FIG. 6, the sum of the pixels in feature rectangle 506 is 2. This value can be rapidly determined from SAT(A), using the formula $$P(X,c1,r1,c2,r2)=SAT(X,c2,r2)-SAT(X,c2,r1-1)-SAT(X,c1-1,r2)+SAT(X,c1-1,r1-1)$$

Once more, the value at any negative row or column index is assumed to be zero. Thus, as shown in FIG. 6 by block 606, the sum of pixels for feature rectangle 506 can be determined as $$P(X,1,3,3,3)=SAT(X,3,3)-SAT(X,3,2)-SAT(X,0,3)+SAT(X,0,2)=7-5-2+2=2$$

In addition to determining an SAT for tile "A" 500, an SAT can also be determined for an area of the target image. Recall that the target image may depict the same object or objects as the image 400. However, perhaps due to camera or scene movement, in the target image the object(s) may be represented at a different position, angle and/or rotation. Thus, in order to align tile "A" 500 in an appropriate location in the target image, tile "A" 500 may be tested at one or more locations within a search area of the target image.

Figure 7:
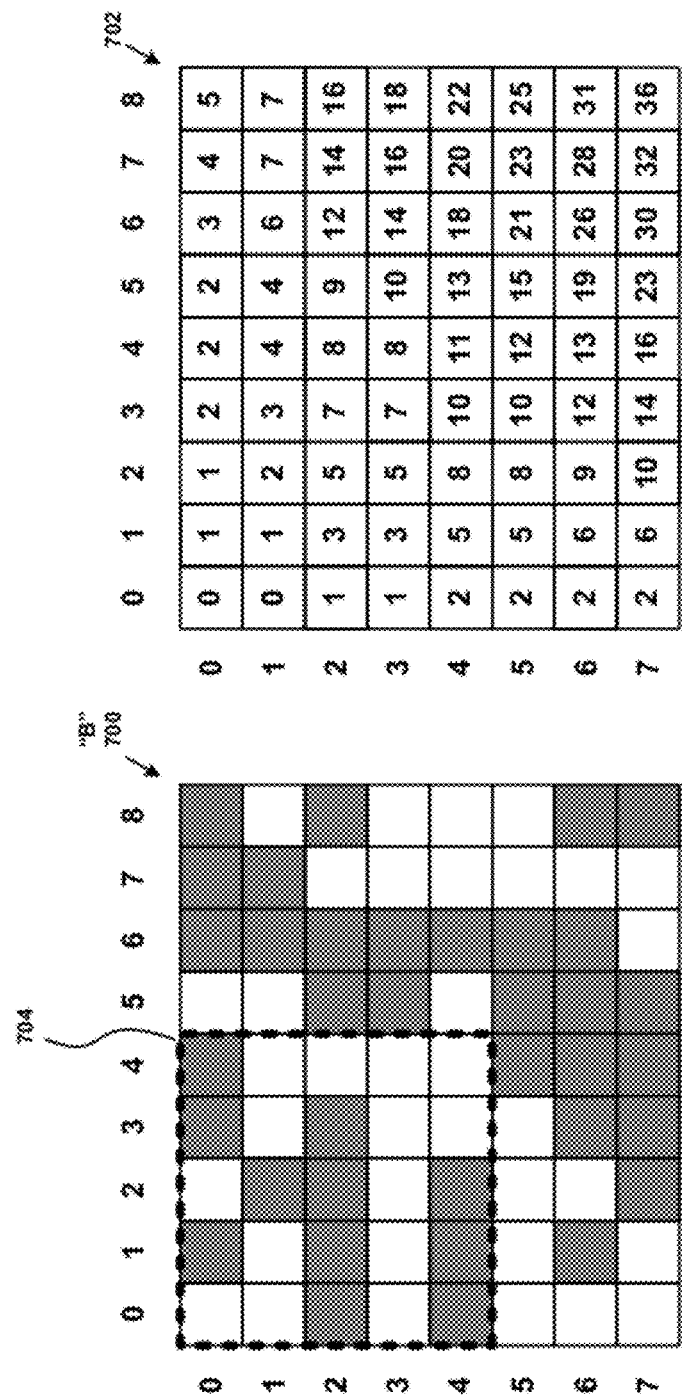
FIG. 7 depicts a search area of a target image and a summed area table for the search area, in accordance with an example embodiment.

FIG. 7 depicts such a search area "B" 700 in the target image. The target image may be, for example, image 402 or image 404. Particularly, search area "B" 700 is larger than tile "A" 500. While tile "A" 500 is 4×3, search area "B" 700 is 8×7. This allows the placement of tile "A" to be tested in one or more of the starting locations 704. Thus, the upper-left-hand corner of tile "A" 500 can be placed in any of the 25 starting locations 704, and compared to the 4×3 rectangle of which the starting location is the upper-left-hand corner. The closer the match between the pixels in tile "A" 500 and the pixels in this 4×3 rectangle of search area "B" 700, the better the alignment.

Figure 8:
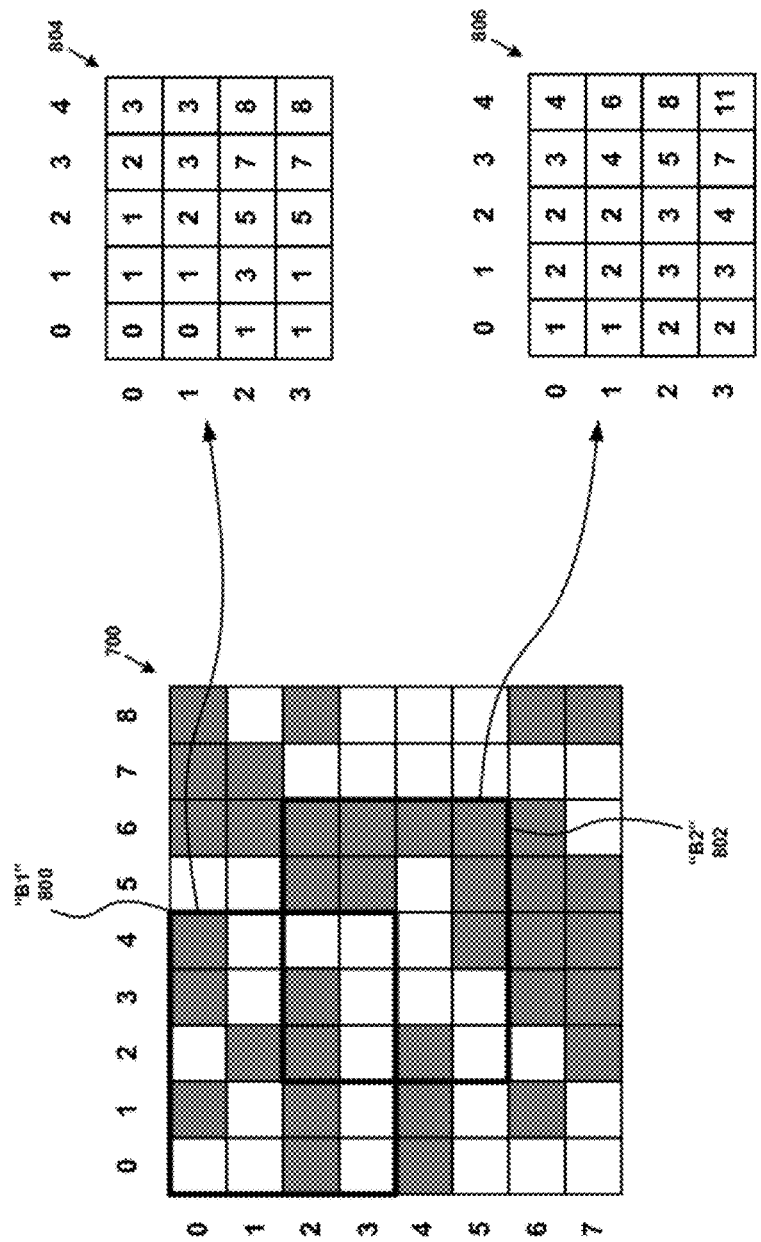
FIG. 8 depicts two sub-rectangles of a search area, and their associated summed area tables, in accordance with an example embodiment.

In order perform this matching, an SAT 702 may be formed for search area "B" 700. SAT 702 may be derived from a pre-calculated SAT for a larger portion of the target image or the whole target image. From SAT 702, the pixel value sums of any rectangle within search area "B" 700 can be determined, in constant time, using the techniques described above. For purposes of example, FIG. 8 shows SATs for two 4×3 sub-rectangles of search area "B" 700. Sub-rectangle "B1" 800 has its upper-left-hand corner at coordinates (0, 0) of search area "B" 700, while sub-rectangle "B2" 802 has its upper-left-hand corner at coordinates (2, 2) of search area "B" 700. SAT 804 can be determined for sub-rectangle "B1" 800, and SAT 806 can be determined for sub-rectangle "B2" 802.

In general, an SAT for a sub-rectangle Y, with its upper-left-hand corner placed at coordinates (c, r) of a rectangle X, can be determined using the formula $$SAT(Y,c',r')=SAT(X,c+c',r+r')-SAT(X,c+c',r-1)-SAT(X,c-1,r+r')+SAT(X,c-1,r-1)$$

Where the value of tile X at any negative row or column index is assumed to be zero. Once the SAT for a sub-rectangle of the search area has been determined, the feature rectangles of the tile "A" 500 can be compared to the corresponding, respective feature rectangles of this sub-rectangle. Note that constructing an actual SAT for a sub-rectangle of the search area may not be required. If an SAT for the entire search area is constructed, the values of any sub-rectangle SAT within this search area can be derived more or less directly by using the formula above. Therefore, in practice, just a search area SAT may be constructed. SATs 804 and 806 are shown mainly for purposes of illustration.

Figure 9:
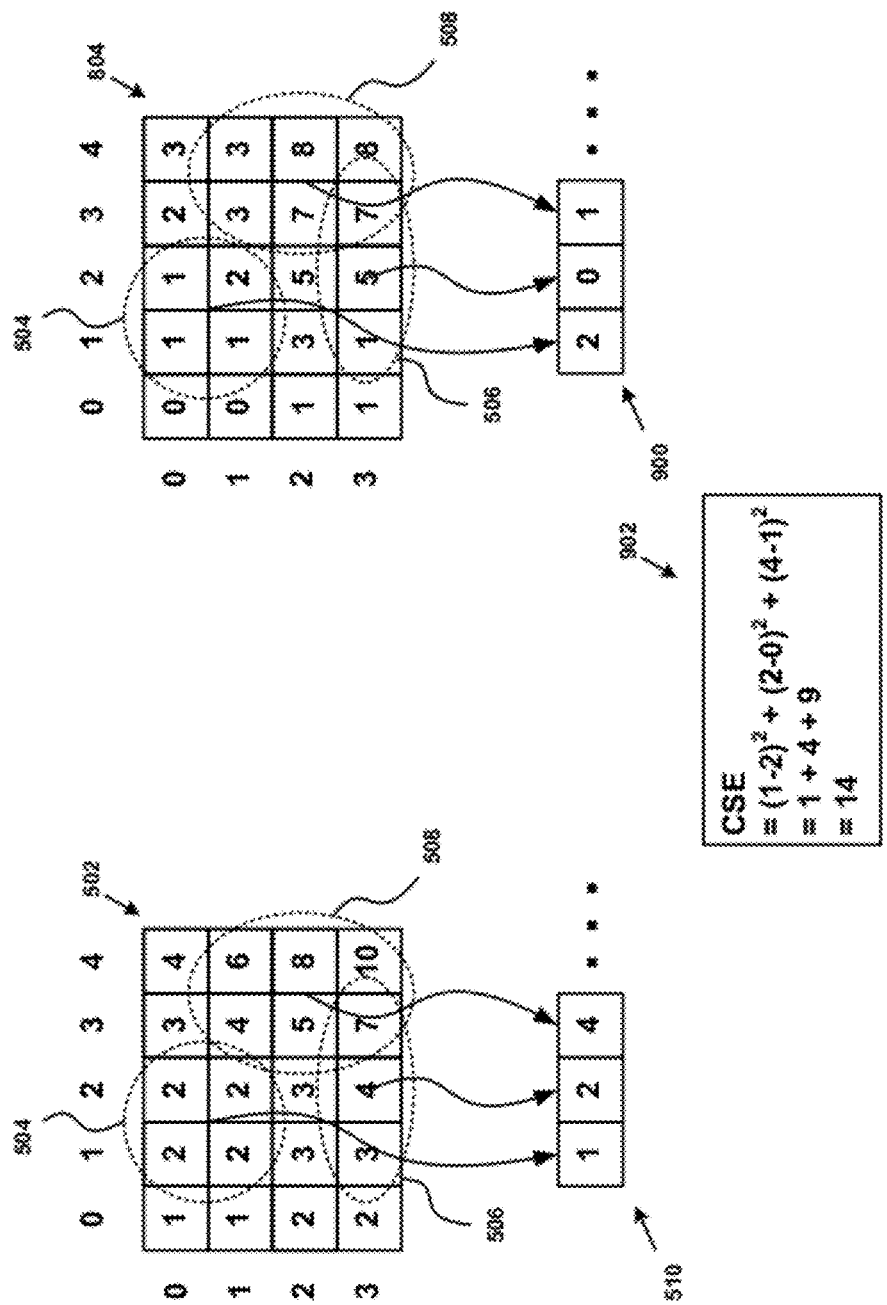
FIG. 9 depicts feature vectors being calculated from summed area tables, and the cumulative squared error of these feature vectors being determined, in accordance with an example embodiment.

FIG. 9 illustrates how such a comparison between SAT 502 (for tile "A" 500) and SAT 804 (for sub-rectangle "B1" 800) can be performed. The sum of pixel values in the cells for the same feature rectangles 504, 506, and 508 are calculated and stored in respective feature vectors. These calculations may use the formula for P(X, c1, r1, c2, r2) as defined above. Thus, feature vector 510 contains the sums 1, 2, and 4 for feature rectangles 504, 506, and 508, respectively, of SAT 502. Similarly, feature vector 900 contains the sums 2, 0, and 1 for feature rectangles 504, 506, and 508, respectively, of SAT 804.

The difference between feature vectors 510 and 900 may be used to represent how well tile "A" 500 matches sub-rectangle "B1" 800. One way of determining the difference between two vectors is to calculate the cumulative squared error of the vectors. Formally, the cumulative squared error (CSE) of two feature vectors, FV1 and FV2, each of length l, can be expressed as $$CSE(FV1, FV2) = \sum_{i=0}^{l} (FV1[i] - FV2[i])^2$$

However, different formulas for determining the difference between two vectors may be used (e.g., a mean squared error). Additionally or alternatively, the CSE formula may be modified so that the exponent is a value other than 2 (e.g., the exponent may take on a value of 1, 1.2, 1.5, 1.7, 2.5, 3, etc.). Optionally, the absolute value of the individual differences may be used, before applying the exponent. Also, optionally, some value C could be subtracted from the individual differences (e.g., to compensate for noise), and the result possibly adjusted to 0 when negative, before applying the exponent.

Figure 10:
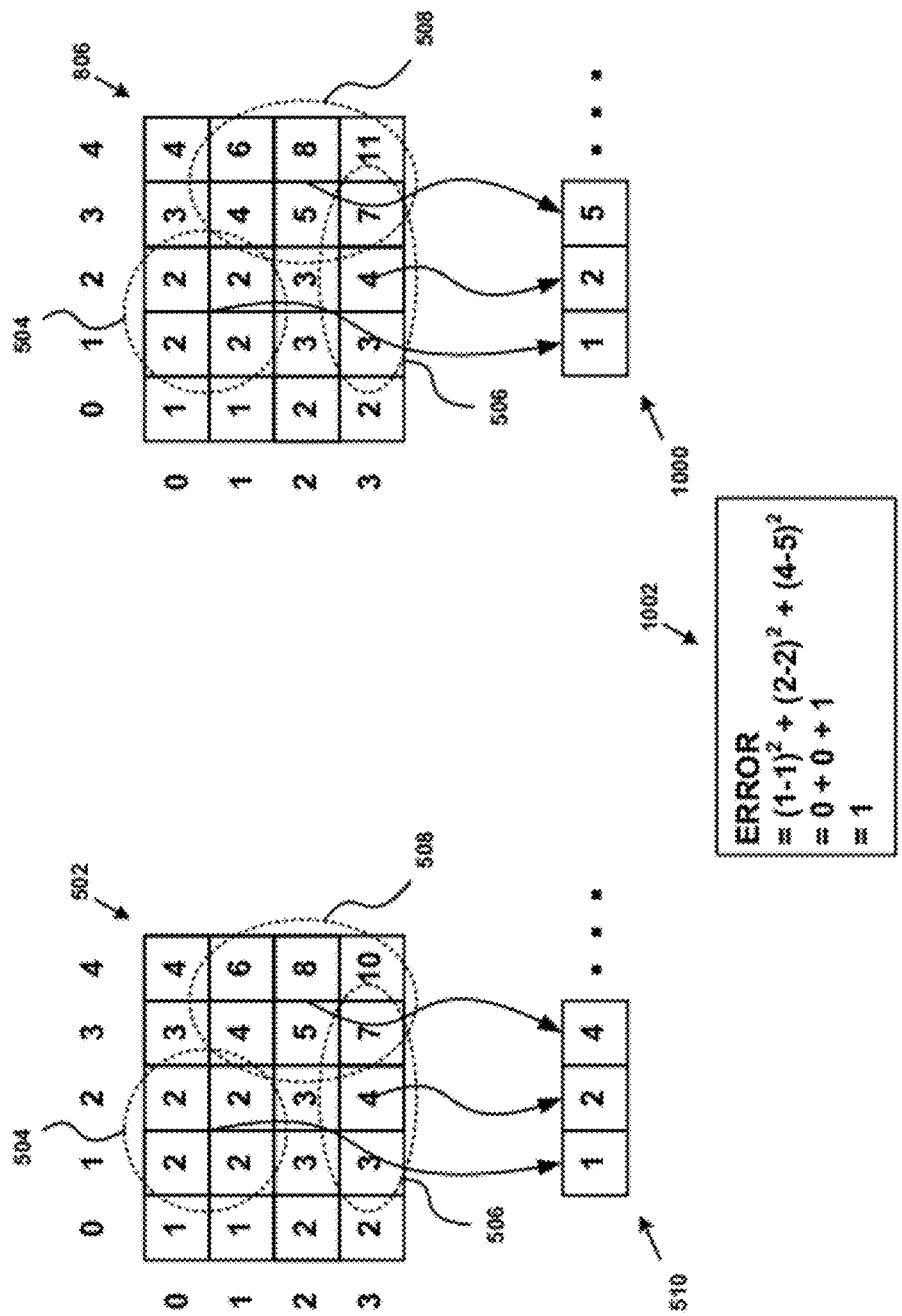
FIG. 10 also depicts feature vectors being calculated from summed area tables, and the cumulative squared error of these feature vectors being determined, in accordance with an example embodiment.

The CSE for feature vectors 510 and 900 is determined to be 14, as shown in block 902. FIG. 10 shows a similar a comparison between SAT 502 and SAT 806 (for sub-rectangle "B2" 802). In FIG. 10, feature vector 1000 contains the sums 1, 2, and 5 for feature rectangles 504, 506, and 508, respectively, of SAT 806. The CSE of feature vectors 510 and 1000 is determined to be 1, as shown in block 1002.

Thus, based on these computational comparisons, sub-rectangle "B2" 802 is a better match of tile "A" 500 than sub-rectangle "B1" 800. This result can be visually verified by comparing tile "A" 500 in FIG. 5 with sub-rectangle "B2" 802 in FIG. 8. It can easily be concluded that tile "A" 500 and sub-rectangle "B2" 802 are identical except for the respective pixels in their lower-right-hand corners, while a number of respective pixels in tile "A" 500 and sub-rectangle "B1" 800 differ.

The match quality of tile "A" 500 and one or more sub-rectangles in the search area may be determined as disclosed above. Then, the sub-rectangle with the best fit, or the top n sub-rectangles with the best fits, may be stored. Additionally, the coordinates (x, y) of the offset between tile "A" 500 in image 400 and sub-rectangle "B2" 802 of the target image may also be stored for each of these sub-rectangles.

Additionally, other tiles (e.g., more high-variance tiles) may be chosen from the source image and compared to respective search areas of the target image. This process may continue until a number of translations have been determined for a number of tiles, and the error (in terms of, for example, CSE) is known for each translation. Thus, for a given tile X, the error of tile X at offset (x, y) may be stored in a data structure as E(x, y).

To summarize, this tile processing may be expressed algorithmically, in high-level pseudo-code, as shown in Table 2.

TABLE 2

1. For each selected tile t of the source image
   a. Construct an SAT for t
   b. Using the SAT for t, calculate the pixel value sum of each defined feature rectangle in t
   c. Using the pixel value sums, define a feature vector for t
   d. Determine a search area s in the target image
   e. Construct an SAT for s
   f. For at least one of the locations l in s
      i. Using the SAT for s, calculate the pixel value sum of each defined feature rectangle in l
      ii. Using the pixel value sums, define a feature vector for l
      iii. Calculate the error between the feature vectors for t and l
   g. Determine respective locations for which the error between the feature vectors for t and these respective locations is low
   h. Store the offset between t and these respective locations C. Selecting a Global Fit Once the match qualities of a number of tiles and offsets of each tile are found, a global fit of the source image to the target image can be determined. Alternatively, a global fit of the target image to the source image can be performed. In some embodiments the selection process can be performed as follows.

First, a set of one or more tiles may be chosen from the source image. For each tile in the set, the respective translation with a low error (e.g., the lowest error) is selected. Alternatively, the tiles in the set could be selected based on their having a high intra-tile variance (see the discussion above in reference to FIG. 4B). Then, based on the number of tiles in the set, a different type of transform may be applied to a group of tiles from the source image to determine the net error of a disjointly translated source image. In some embodiments, the group of tiles will include the tiles for which an SAT and/or a feature vector already exists, in order to be computationally efficient.

Figure 11:
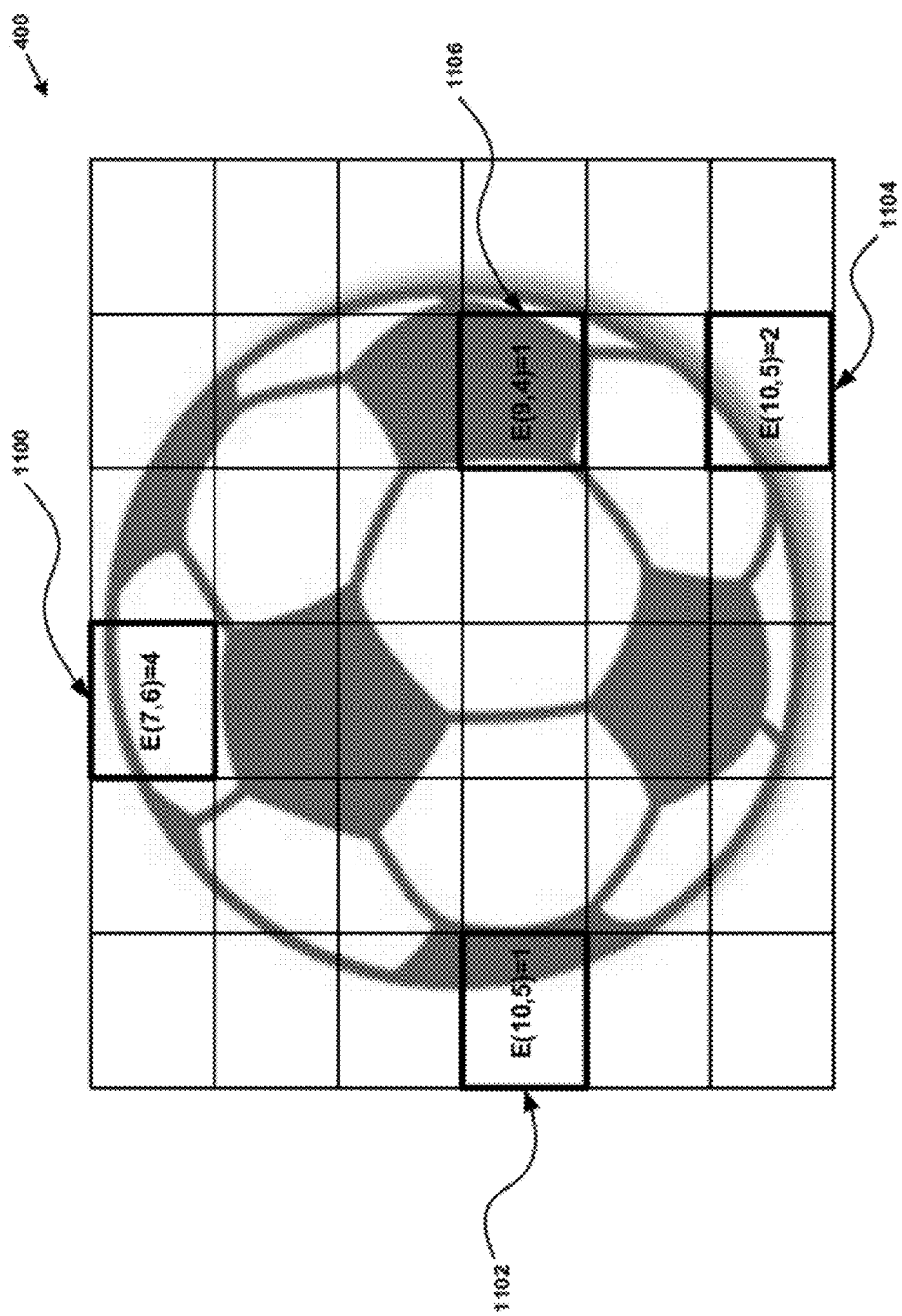
FIG. 11 depicts identified low-error tiles from a source image, in accordance with an example embodiment.

For example, FIG. 11 illustrates a set of four tiles being chosen from source image 400. Tile 1100 has a lowest error of 4 at offset (7, 6), tile 1102 has a lowest error of 1 at offset (10, 5), tile 1104 has a lowest error of 2 at offset (10, 5), and tile 1106 has a lowest error of 1 at offset (9, 4).

With respect to the number of tiles chosen, if the set consists of just one tile, and the translation with the lowest error for this tile is represented by a given offset, the given offset may be applied to a group of additional tiles. The resulting disjointly translated source image may be the source image shifted by the (x, y) values of the offset. If the set consists of two tiles, a similarity transform can be applied based on the respective translations of each tile in the group. The resulting disjointly translated source image may be the source image shifted and scaled according to these respective translations. If the set consists of three tiles, an affine transform can be applied based on the respective translations of each tile in the group. The resulting disjointly translated source image may be the source image shifted, scaled, and rotated according to these respective translations. If the set consists of four tiles, a homography transform can be applied based on the respective translations of each tile in the group. The resulting disjointly translated source image may be the source image shifted, scaled, rotated, and warped according to these respective translations. Regardless of the number of tiles in the set or the type of transform used, the net error of the transform can be determined by summing the error for each translated tile from the group. This net error represents a cost of the translation that was performed.

This process of (i) choosing tiles, (ii) using the offsets of the tiles to translate a group of additional tiles, thereby forming a disjointly translated source image, and (iii) evaluating the net error of the performed transformation, may take place a number of times, perhaps anywhere from 50-100 times or even 10-500 times. For each such trial, different sets of tiles may be chosen, either based on their having a translation with a low error, and/or randomly. Advantageously, since the error values of various translations for various tiles that were calculated at previous steps can be cached, these error values can be looked up in constant time during this process.

Then, once a disjointly translated source image with a low (e.g., the lowest) net error is found, a general transformation may be derived based on the tile translations. All of the pixels in the source image may be transformed to form an aligned source image that serves as a "match" of the target image. The general transformation may comprise a high-quality transform, perhaps even computing the offsets at the sub-pixel level, and using bilinear interpolation to determine the final pixel colors. Alternatively, the target image may be transformed to form an aligned target image that serves as a "match" of the source image.

Figure 12:
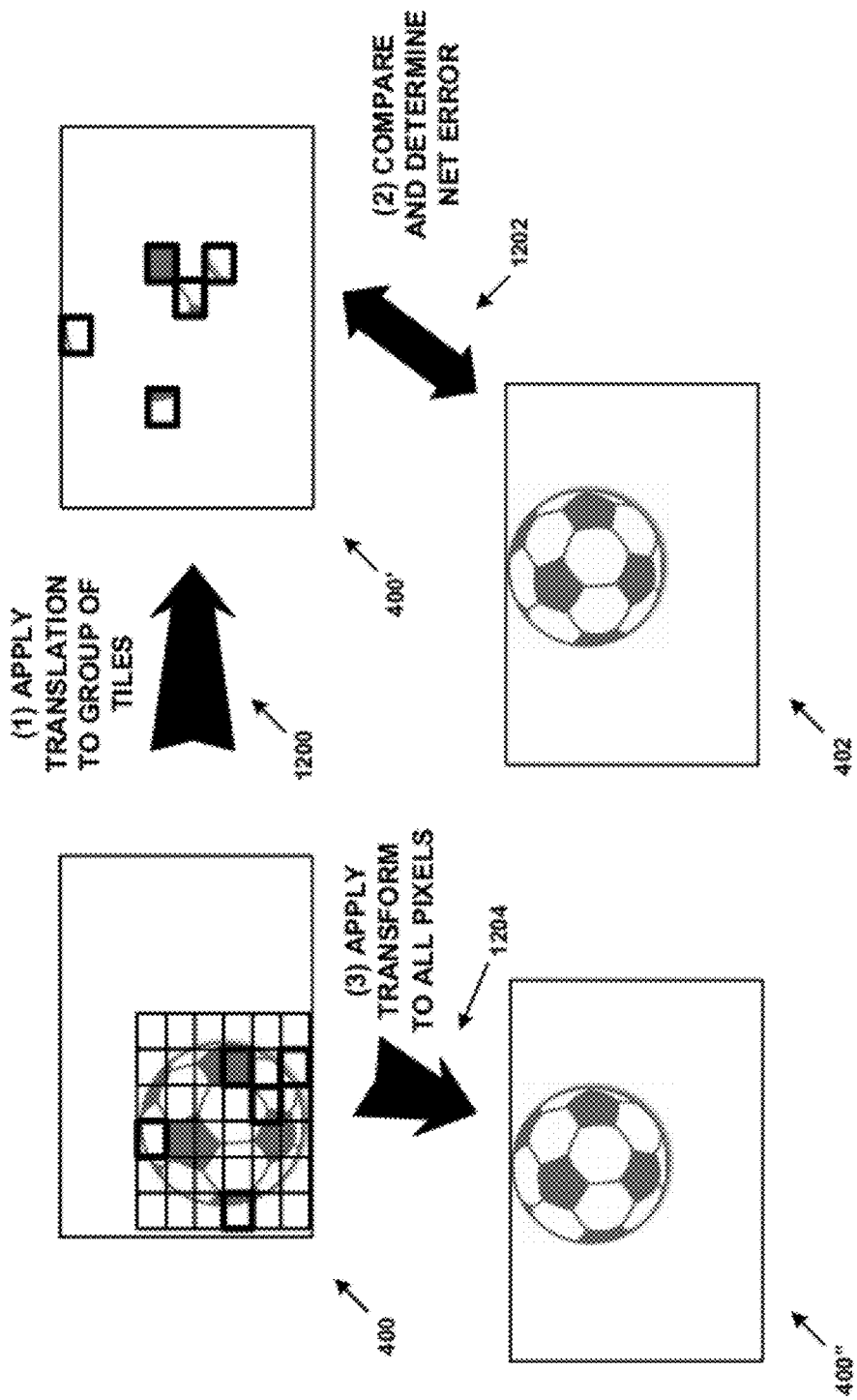
FIG. 12 depicts applying translations to a group of tiles in a source image, and also applying a corresponding transformation to all of the pixels in the source image, in accordance with an example embodiment.

FIG. 12 illustrates the process of selecting a global fit. At step 1200, a transform is applied to a group of tiles. In this case, a transform (e.g., an offset transform, a similarity transform, an affine transform, or a homography transform) is applied to the four tiles of source image 400 highlighted in FIG. 11, as well as one additional tile. The result of this transform is represented as disjointly translated source image 400'. Then, at step 1202, the net error between disjointly translated source image 400' and target image 402 is calculated. Assuming that this net error is sufficiently low, at step 1204 the same transform may be applied to all pixels in source image 400, to form aligned source image 400". In many cases, this process may result in a very close match between translated source image 400" and target image 402, as is shown in FIG. 12.

It should be understood that the aligned source image and the target image may not be perfectly aligned, but in practice the alignment between these two images may be close enough to provide a useful result. Once the source image and target images are aligned in this fashion, various applications, such as image enhancement, image stabilization, pattern matching, and/or object recognition can be facilitated.

It should also be understood that instead of applying the transform to a group of tiles to form a disjointly translated source image, a full transform all of the tiles in the source image can be performed. Then, the net error between the resulting translated source image and the target image can be determined. However, performing a full transform can be computationally expensive. Thus, transforms may be performed on a limited number of tiles to determine an alignment with a low net error, and only then might a full transform be performed.

Another possible variation of the embodiments herein is to apply more than one transform to an image. For instance, one transform may be applied to part of an image and another transform may be applied to another part of the image.

To summarize, this selection of a global fit may be expressed algorithmically, in high-level pseudo-code, as shown in Table 3.

TABLE 3

1. Set E' = oo (positive infinity)
2. Do 10-500 times
   a. From a source image, select a set of one or more tiles that exhibit a low error
   b. Based on the respective offsets of these tiles, apply a transform to a group of tiles from the source image to form a disjointly transformed source image
   c. Compare the disjointly transformed source image to the target image to determine a net error, E
   d. If E < E' then set E' = E
3. Perform the transform of all pixels in the source image based on the tiles having error E'

4. Multi-Resolution Analysis

Any of the embodiments disclosed herein can optionally be enhanced by performing a multi-resolution analysis of the target image. Generally speaking, such a multi-resolution analysis involves, for a given tile, downsampling the pixels in the given tile a number of times.

Downsampling can be implemented by, for example, dividing the given tile into 2×2 blocks, and replacing each of these blocks by a single pixel. The value of this replacement pixel can be based on the values of the pixels in the block. For instance, the value of the replacement pixel may be determined by taking an average of the values of the four pixels in the block, resulting in a "fuzzier," lower-resolution downsampled tile of one-quarter the size of the full tile. Thus, if a 64×64 tile is downsampled one level, the result is a 32×32 tile. If the 64×64 tile is downsampled two levels (or the 32×32 tile is downsampled one level), the result is a 16×16 tile, and so on. Nonetheless, a tile can be downsampled in other ways. For example, a 3×3 block or a 4×4 block can be replaced by a single pixel, and more than just one or two levels of downsampling can be performed for a tile.

A downsampled tile, perhaps the downsampled tile at the downsampling level with the lowest resolution, may be compared to a similarly-downsampled search area of the target image. The alignment procedures disclosed above for using feature rectangles to form feature vectors, and to compute errors values based on these feature vectors, may be used. As a result, one or more low-error alignments for the downsampled tile may be identified. For instance, the n lowest-error alignments may be identified.

Then, one of these alignments is selected, perhaps the lowest-error translation, and the alignment procedures are repeated using the next-highest level of the downsampled tile and the downsampled search area for the alignment. If the result is a low-error alignment, the alignment procedure can be repeated with an even higher level of the downsampled tile. However, if the result is not a low-error alignment, another of the n lowest-error alignments may be selected, the alignment procedures are repeated using the next-highest level of the downsampled tile and the downsampled search area for this alignment.

Figure 13:
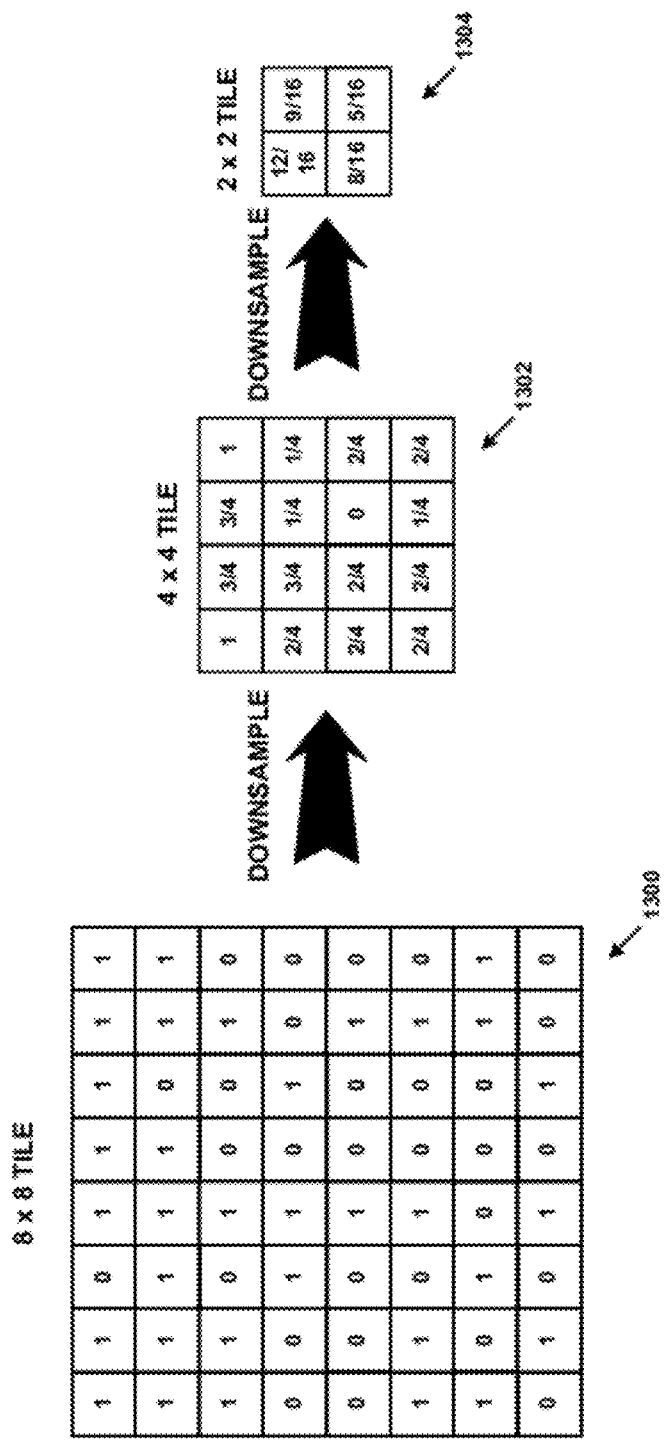
FIG. 13 depicts an example of downsampling an 8×8 tile two successive levels, to a 4×4 tile and a 2×2 tile, in accordance with an example embodiment.

FIG. 13 provides an illustration of how a tile of a source image can be downsampled to facilitate multi-resolution analysis. Particularly, an 8×8 bitmap tile 1300 is downsampled one level into 4×4 tile 1302. For sake of consistency, the non-integer values in tile 1302 are all shown with a denominator of 4. Tile 1302 is downsampled another level into 2×2 tile 1304. Again, for sake of consistency, the non-integer values in tile 1304 are all shown with a denominator of 16.

Figure 14:
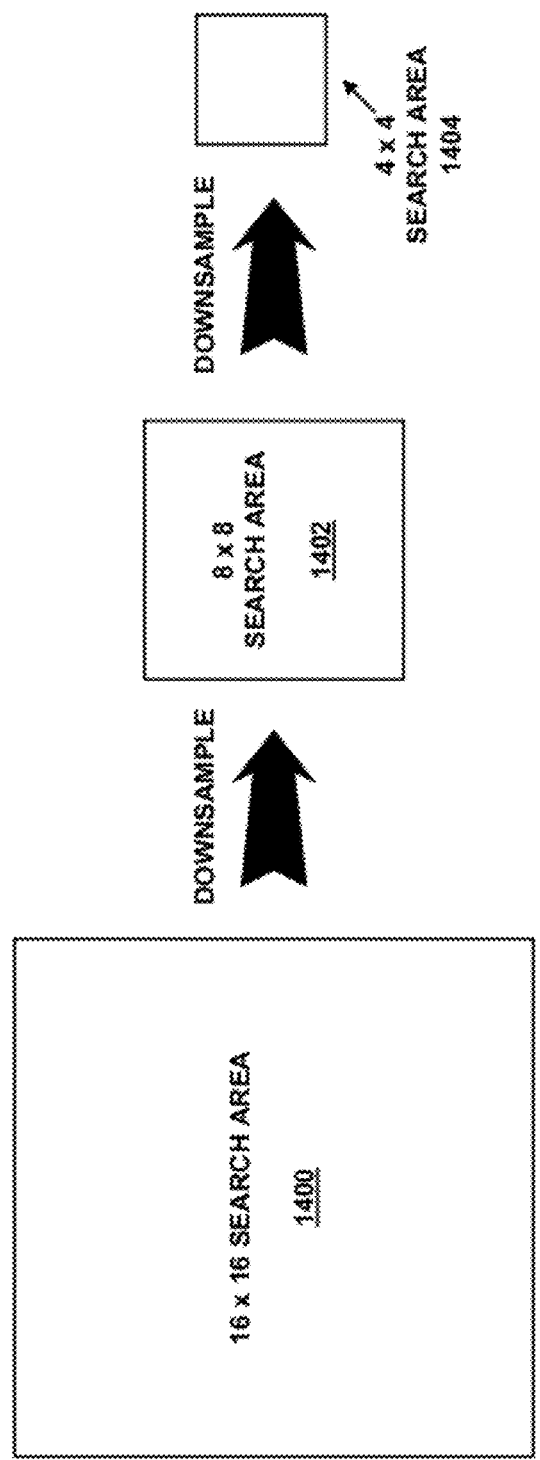
FIG. 14 depicts an example of downsampling a 16×16 search area two successive levels, to an 8×8 search area and a 4×4 search area, in accordance with an example embodiment.

FIG. 14 shows how a search area can also be downsampled to facilitate multi-resolution analysis. Particularly, consider 16×16 search area 1400, which is presumed to be the search area from the target image in which tile 1300 is to be aligned (for purposes of simplicity, individual pixel values are not shown in FIG. 14). Search area 1400 may be downsampled one level to form 8×8 search area 1402. This downsampling can be performed in the same fashion as the downsampling of tile 1300—that is, 2×2 blocks of pixels in search area 1400 can be replaced with a single pixel in search area 1402, where the pixel value of the single pixel may be an average of the pixel values of the pixels in the 2×2 block. Similarly, search area 1402 can be downsampled an additional level to form 4×4 search area 1404.

Notably, in search area 1400, there are 81 possible starting positions for tile 1300 (i.e., the upper-left-most pixel of tile 1300 can be evaluated in 9 columns and in 9 rows for each of these columns). However, in search area 1402, there are 16 possible starting positions for tile 1302, and in search area 1404, there are only 9 possible starting positions for tile 1304. Thus, in some cases, it can be computationally efficient to start with a tile with a high degree of downsampling (e.g., the 1304), and test alignments of that tile in the starting positions of an equivalently downsampled search area (e.g., search area 1404). Then, based on any resulting one or more low-error alignments, corresponding tiles and search areas with lower levels of downsampling can be tested until a low-error of the original tile and search area is found.

Figure 15:
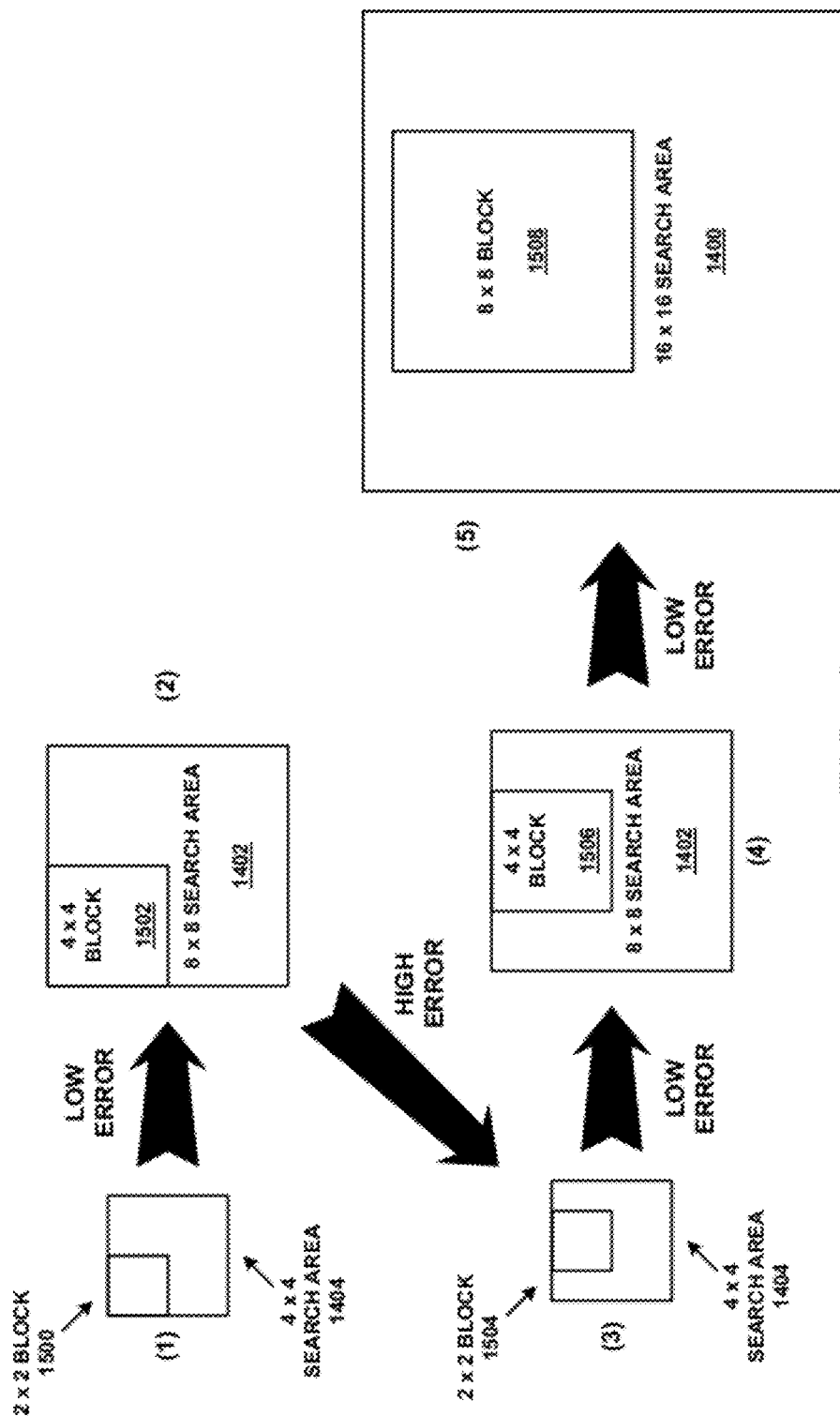
FIG. 15 depicts an example of a multi-resolution analysis used for image alignment, in accordance with an example embodiment.

FIG. 15 illustrates multi-resolution analysis using the tiles of FIG. 13 and the search areas of FIG. 14. Initially, and not shown in FIG. 15, the alignment of all 9 possible starting positions for tile 1304 in search area 1404 are tested. Suppose that, based on these tests, the alignments of tile 1304 at starting position (0, 0) and (1, 0) result in the lowest errors.

At step (1), the alignment of tile 1304 is tested in 2×2 block 1500 of search area 1404. As shown in FIG. 15, block 1500 is located at starting position (0, 0) of search area 1404. This alignment results in a low error. Therefore, at step (2), the alignment of tile 1302 is then tested in 4×4 block 1502 of search area 1402. Block 1502 is located at starting position (0, 0) of search area 1402. As part of step (2), the alignment of tile 1302 may also be tested in nearby blocks of search area 1402.

For example, the alignment of tile 1302 may be tested in all blocks within one pixel of block 1502, i.e., the blocks with starting positions (1, 0), (0, 1), and (1, 1) in search area 1402. The testing of nearby blocks within R pixels of an initial starting position can be referred to as using a refinement radius of R pixels. Thus, alignments can be tested in blocks associated with any valid refinement radius. For instance, using a value of R=2, the alignment of tile 1302 can be tested in all blocks within two pixels of 4×4 block 1502.

If a low-error alignment is found, then this process can be repeated by testing the alignment of tile 1300 in a corresponding location of search area 1400. However, for sake of argument, suppose that the alignments of tile 1302 with block 1502 and all blocks within the refinement radius of R results in high errors. Then, at step (3) another low-error alignment of tile 1304 will be selected. In this case, the low-error alignment of tile 1304 in 2×2 block 1504 is selected, and at step (4) the alignment of tile 1302 is then tested in 4×4 block 1506 of search area 1402. Block 1506 is located at starting position (2, 0) of search area 1402. As was the case for step (2), in step (4) the alignment of tile 1302 may also be tested for blocks within a refinement radius of R. Alternatively, different values of R may be used at two or more levels of downsampling.

Suppose that one of these blocks, other than 4×4 block 1506, results in a low-error alignment. Then, at step (5), the alignment of tile 1300 is tested against the corresponding block (i.e., 8×8 block 1508) of search area 1400. Note that this test occurs at the highest resolution (the resolution at which there has been no downsampling). Therefore, if this test results in a low error, block 1508 may be classified as a potential alignment for tile 1300. Also, similar to steps (2) and (4), step (5) may involve the alignment of tile 1300 being tested in other starting positions according to a given refinement radius.

Alternatively, a number of translations (N) of a given tile can be chosen at the downsampling level with the lowest resolution. The error for each translation may be determined. Then at the downsampling level with the next-highest resolution and the magnitude of each translation is doubled and tested within the refinement radius. This process continues until the downsampling level with the highest resolution is reached (i.e., the level with no downsampling), resulting in N possible alignments for the given tile, and a respective error for each.

5. Distributed Analysis

In addition to using multi-resolution analysis, the embodiments disclosed herein can be distributed amongst two or more computing devices. While the individual steps, functions, features, and/or processes may be distributed in a number of ways, two specific distributions are described below.

Figure 16:
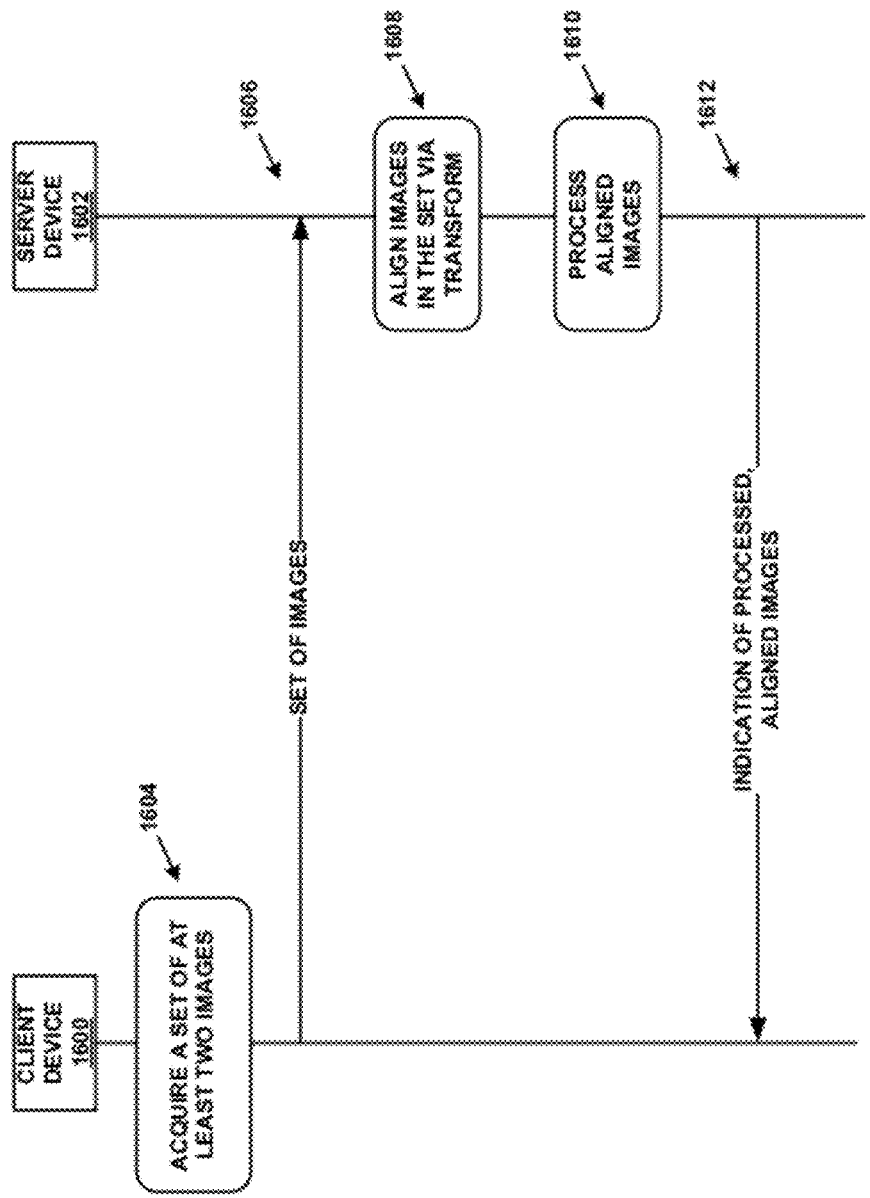
FIG. 16 depicts an example image alignment procedure with processing split between a client device and a server device, in accordance with an example embodiment.

FIG. 16 is a message flow that illustrates one possible way of distributing the image alignment and/or other image processing between a client device 1600 and a server device 1602. Client device 1600 may be, for example, similar to client device 300. In some cases, client device 1600 may have limited processing, communication, and/or battery capacity. On the other hand, server device 1602 may exemplify one or more cloud-based servers or clusters of cloud-based servers, such as those of FIGS. 2A and 2B. Thus, server device 1602 may have far more processing and communication capacity than client device 1600, and no need to rely on batteries. Therefore, it may behoove client device 1600 to offload at least some image alignment processing (and perhaps related processing as well) to server device 1602.

Accordingly, at step 1604, client device 1600 may acquire a set of at least two images. This set may be, for example, two images of the same object from which the user of client device 1600 wishes to produce a de-noised image of the object. On the other hand, the set may include a series of frames from a video that the user of client device 1600 wishes to stabilize.

At step 1606, client device 1600 may transmit the set of images to server device 1602. At step 1608, server device

1602 may align the images in the set, perhaps via a transform. Particularly, server device 1602 may perform at least some of the embodiments illustrated by FIG. 4B through FIG. 12. Optionally, at step 1610, server device 1602 may further process the aligned images. For instance, server device 1602 may use the aligned images to produce a de-noised image or a stabilized video stream.

Then, at step 1612, server device 1602 may transmit an indication of the processed, aligned images to client device 1600. This indication may take various forms. For instance, the indication may include a uniform resource locator (URL) that can be used to access the processed, aligned images, and the indication may include a copy of the processed, aligned images. The indication may be delivered to client device 1600 via, for instance, email, text message, multimedia message, instant message, a social networking site, or some other means. Instead of or in addition to transmitting the indication of the target image(s), server device 1602 may transmit an indication of the transform to client device 1600, and client device 1600 may perform the transform.

An advantage of this technique is that the majority of the image alignment processing is offloaded from client device 1600 to server device 1602. However, in some situations, client device 1600 may not have sufficient network capacity available to efficiently transmit one or more images to server device 1602.

Figure 17:
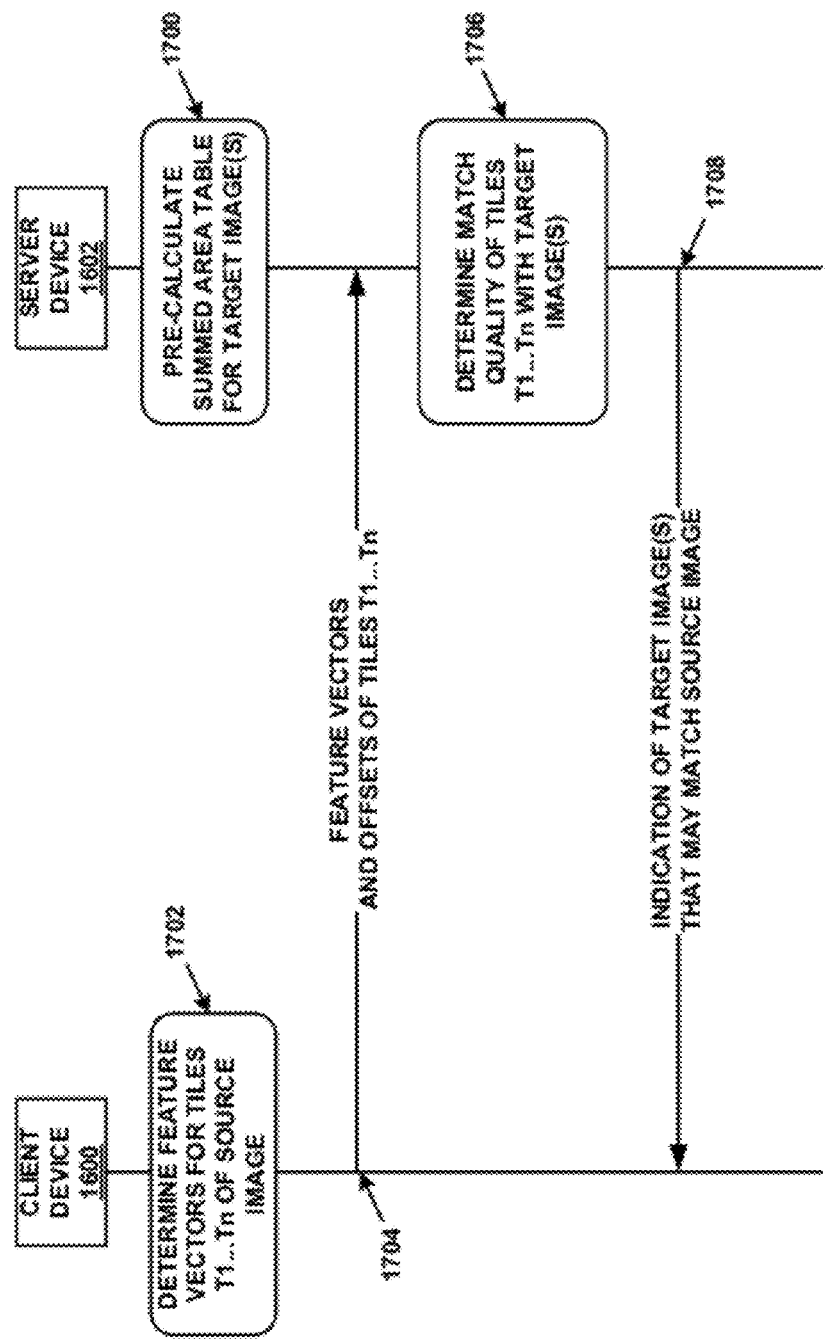
FIG. 17 depicts another example image alignment procedure with processing split between a client device and a server device, in accordance with an example embodiment.

Thus, FIG. 17 is a message flow that illustrates another possible way of distributing the image alignment processing between client device 1600 and server device 1602. At step 1700, server device 1602 pre-calculates SATs for one or more target images. In some cases, server 1602 may store or have access to a large database of images. The user of client device 1600 may wish to use this database to facilitate identification of an object in an image on client device 1600. For example, if client device 1600 has a camera function, the user may use the camera function of client device 1600 to take a picture of an unknown object, and save this picture as a source image.

At step 1702, client device 1600 may determine feature vectors for n tiles, $T1 \ldots Tn$, of the source image. At step 1704, client device 1600 may transmit the feature vectors (and possibly their respective offsets) to server device 1602. At step 1706, server device 1602 may determine a match quality of tiles $T1 \ldots Tn$ with target image(s) from the database. Particularly, server device 1602 may perform at least some of the embodiments illustrated by FIG. 7 through FIG. 12. Then, at step 1708, server device 1602 may transmit, to client device 1600, an indication of the target image(s) that may match the source image.

As was the case for step 1612, this indication may take various forms, such as a URL that can be used to access the matched target image(s), a copy of the matched target image(s), or a description of the matched target image(s). Similarly, the indication may be delivered to client device 1600 via email, text message, multimedia message, instant message, a social networking site, or some other means. Also like step 1612, instead of or in addition to transmitting the indication of the target image(s), server device 1602 may transmit an indication of the transform to client device 1600, and client device 1600 may perform the transform.

FIGS. 16 and 17 depict two possible ways of distributing image alignment processing between two devices. However, these figures and their accompanying description is presented for purpose of example, and other ways of distributing this processing between two or more devices fall within the scope of this disclosure.

6. Example Operations

Figure 18A:
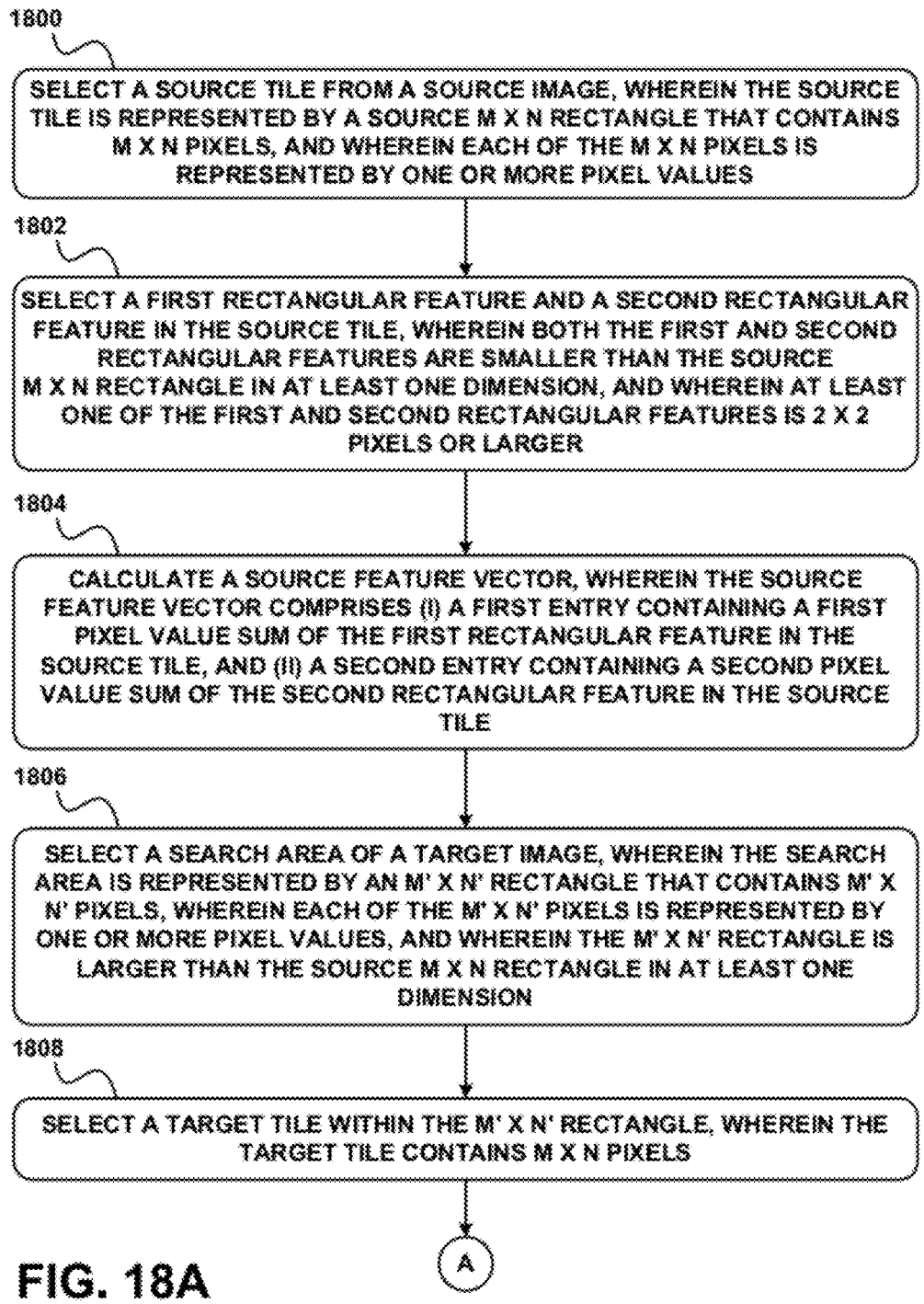
FIGS. 18A and 18B are a flow chart of a method, in accordance with an example embodiment.
Figure 18B:
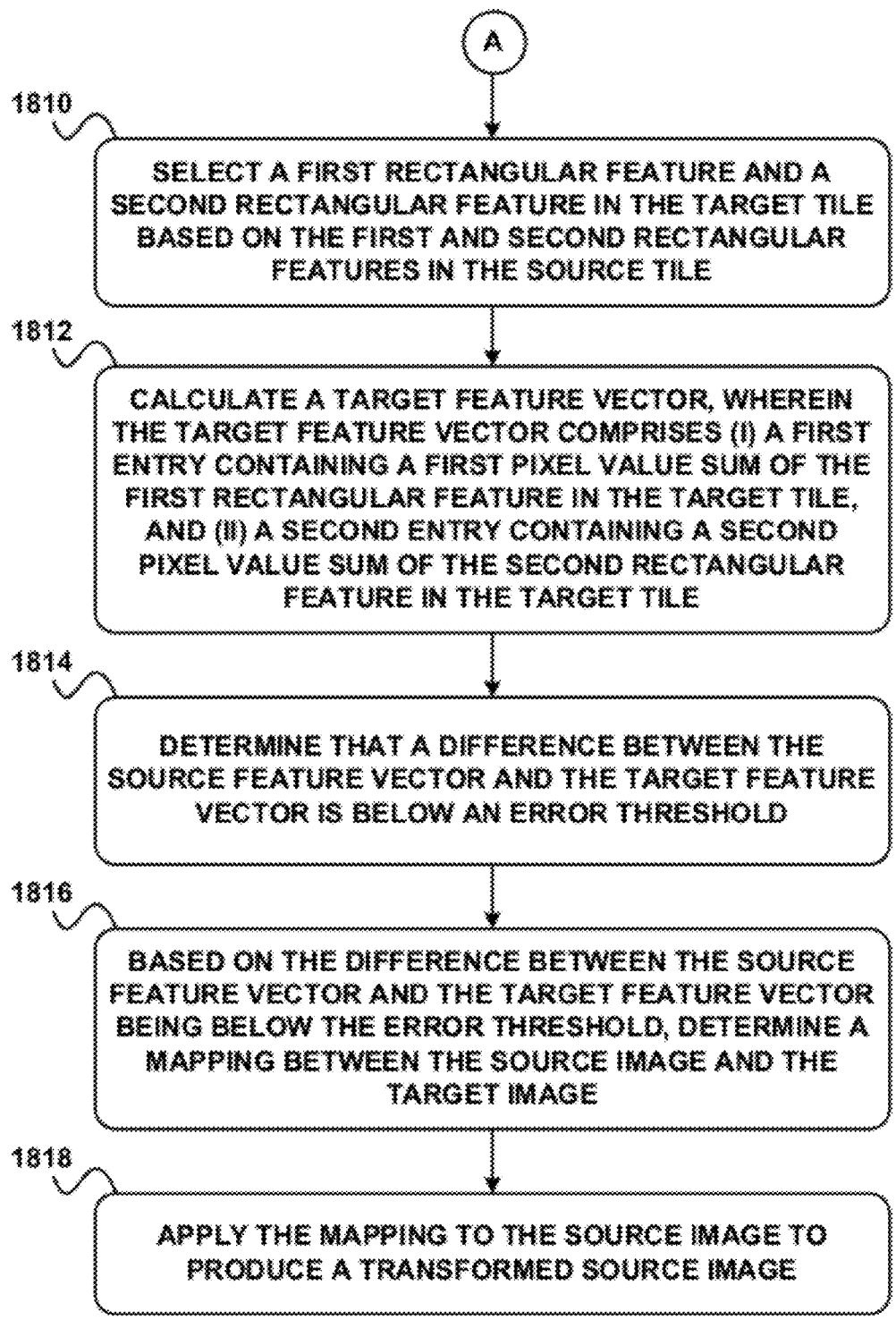

FIGS. 18A and 18B are a flow chart of a method, in accordance with an example embodiment. This method may be carried out by a single device, or portions of this method may be distributed between multiple devices.

At block 1800, a source tile may be selected from a source image. The source tile may be represented by a source m×n rectangle that contains m×n pixels, where each of the m×n pixels is represented by one or more pixel values. In some cases m=n, and thus the source tile will be square.

Selecting the source tile from the source image may involve calculating a variance metric for the source tile based on the one or more pixel values of each of the m×n pixels in the source tile, determining that the variance metric meets a variance threshold, and selecting the source tile based on determining that the variance metric meets a variance threshold.

At block 1802, a first rectangular feature and a second rectangular feature may be selected in the source tile. Both the first and second rectangular features may be smaller than the source m×n rectangle in at least one dimension. In some embodiments, at least one of the first and second rectangular features can be 2×2 pixels or larger.

At block 1804, a source feature vector may be calculated. The source feature vector may include a first entry containing a first pixel value sum of the first rectangular feature in the source tile, and a second entry containing a second pixel value sum of the second rectangular feature in the source tile.

In some embodiments, calculating the source feature vector may be based on a source SAT for the source tile. For instance, the source SAT may contain m×n entries, and may take the form of an m×n rectangle. Constructing the source SAT for the source tile may involve determining a respective sum of pixels in a sub-rectangle defined by upper-left-hand corner coordinates (0, 0) of the source tile and lower-right-hand corner coordinates (i,j) of the source tile for each respective entry (i,j) of the source tile, and writing the respective sum in the respective entry (i,j) of the source SAT. As described in Section 3B, the source SAT may be constructed from an image SAT in time proportional to the size of the source SAT. The image SAT may have been pre-constructed from the source image.

At block 1806, a search area of a target image may be selected. The search area may be represented by an m'×n' rectangle that contains m'×n' pixels, where each of the m'×n' pixels is represented by one or more pixel values. The m'×n' rectangle may be larger than the source m×n rectangle in at least one dimension.

At block 1808, a target tile may be selected within the m'×n' rectangle. The target tile may contain m×n pixels. Selecting the target tile may involve downsampling the source tile to form a downsampled source tile, downsampling the target tile to form a downsampled target tile, and determining that an alignment difference between the downsampled source tile and the downsampled target tile is below an alignment threshold. The alignment difference may be calculated using the feature vectors of the downsampled source tile and target tile. Moreover, any of the multi-resolution techniques disclosed in Section 4 may be used as part of or in addition to block 1808.

At block 1810, a first rectangular feature and a second rectangular feature may be selected in the target tile. The first and second rectangular features in the target tile may be based on the first and second rectangular features in the source tile. For example, the first and second rectangular features in the target tile may have the same coordinates and/or shape as the first and second rectangular features in the source tile.

At block 1812, a target feature vector may be calculated. The target feature vector may include a first entry containing a first pixel value sum of the first rectangular feature in the target tile, and a second entry containing a second pixel value sum of the second rectangular feature in the target tile.

At block 1814, a difference between the source feature vector and the target feature vector may be determined to be below an error threshold. Determining the difference between the source feature vector and the target feature vector may involve calculating a respective error value between each respective entry (k) of the source feature vector and a respective entry (k) of the target feature vector. For instance, each of the respective error values may be squared and summed to form a cumulative squared error, and the difference may be based on the cumulative squared error.

At block 1816, based on the difference between the source feature vector and the target feature vector being below the error threshold, a mapping may be determined between the source image and the target image. Determining the mapping between the source image and the target image may involve determining an offset between the source tile and the target tile.

At block 1818, the mapping may be applied to the source image to produce a transformed source image. Applying the mapping to the source image may include, for instance, applying one of an offset transform, a similarity transform, an affine transform and a homography transform to the source image using at least the offset between the source tile and the target tile.

In some embodiments, the processing represented by the blocks of FIGS. 18A and 18B may be distributed between multiple devices. Thus, for example, before selecting the source tile from the source image, the source image and the target image may be received from a client device. Additionally, after applying the mapping to the source image, an indication may be transmitted to the client device, wherein the indication provides a reference to media based on the transformed source image.

Figure 19A:
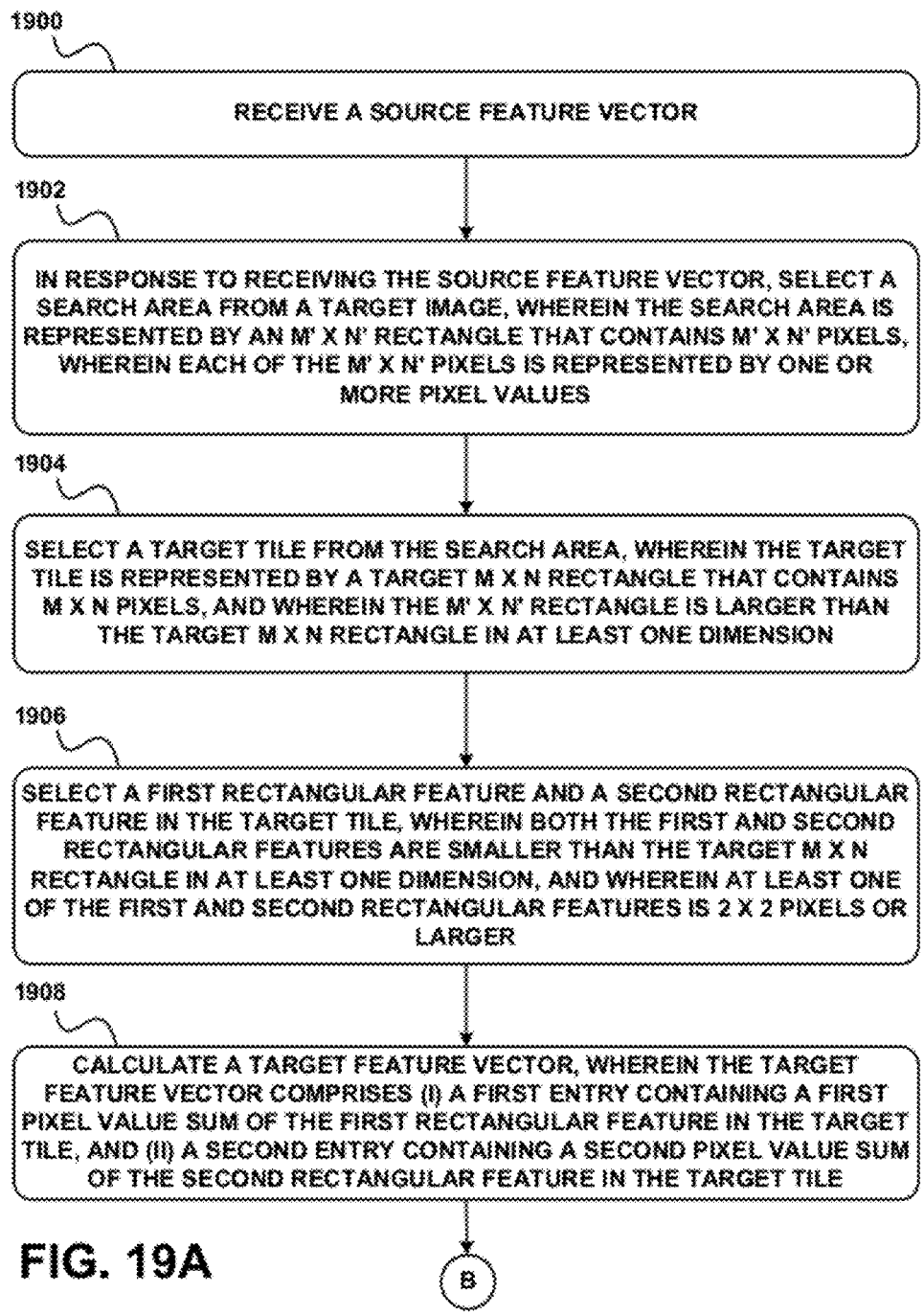
FIGS. 19A and 19B are another flow chart of a method, in accordance with an example embodiment.
Figure 19B:
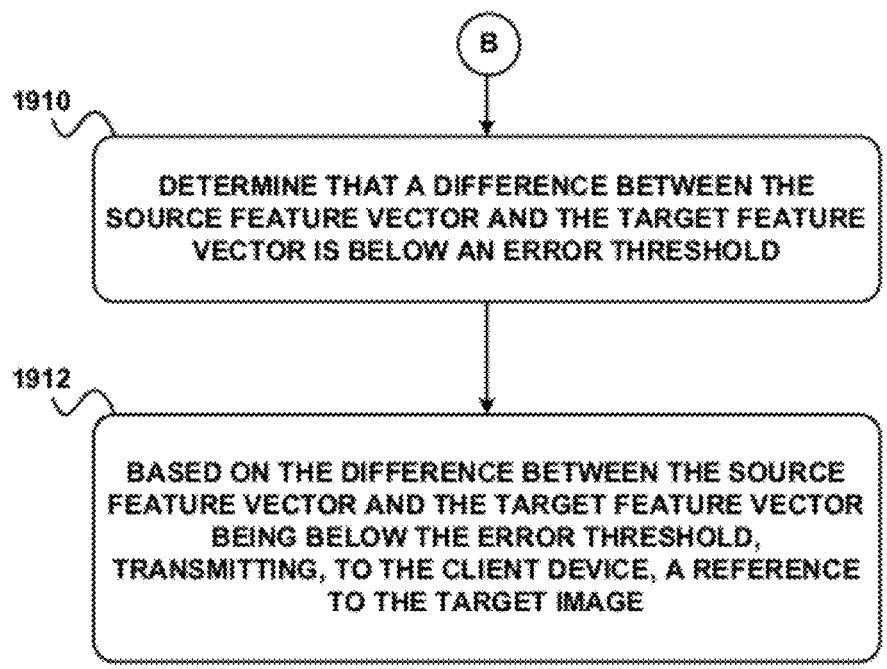

FIGS. 19A and 19B are a flow chart of a method, in accordance with an example embodiment. These Figures illustrate a way of distributing the image alignment processing between multiple devices. Accordingly, at block 1900, a server device may receive a source feature vector from a client device.

At block 1902, in response to receiving the source feature vector, a search area from a target image may be selected. The search area may be represented by an m'×n' rectangle that contains m'×n' pixels, where each of the m'×n' pixels is represented by one or more pixel values.

At step 1904, a target tile from the search area may be selected. The target tile may be represented by a target m×n rectangle that contains m×n pixels. The m'×n' rectangle may be larger than the target m×n rectangle in at least one dimension.

At step 1906, a first rectangular feature and a second rectangular feature may be selected in the target tile. Both the first and second rectangular features may be smaller than the target m×n rectangle in at least one dimension, and at least one of the first and second rectangular features may be 2×2 pixels or larger.

At step 1908, a target feature vector may be calculated. The target feature vector may include a first entry containing a first pixel value sum of the first rectangular feature in the target tile, and a second entry containing a second pixel value sum of the second rectangular feature in the target tile.

For example, a target SAT may be constructed for the target tile. The target SAT may contain m×n entries, and calculating the target feature vector may be based on the target SAT. Additionally, the target SAT may take the form of an m×n rectangle. Thus, constructing the target SAT for the target tile may involve, for each respective entry (i, j) of the target tile, calculating a respective sum of pixels in a sub-rectangle defined by upper-left-hand corner coordinates (0, 0) of the target tile and lower-right-hand corner coordinates (i, j) of the target tile, and writing the respective sum in the respective entry (i, j) of the target SAT. The source SAT may be constructed from an image SAT in time proportional to the size of the source SAT. The image SAT may be pre-constructed from the target image.

At step 1910, a difference between the source feature vector and the target feature vector may be determined to be below an error threshold.

At step 1912, based on the difference between the source feature vector and the target feature vector being below the error threshold, an indication of the target image may be transmitted to the client device. This indication may be, for instance, a URL that can be used to access the target image, and/or a copy of the target image.

7. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
    selecting a source shape from a source image, wherein the source shape contains p>4 pixels;
    selecting a first set of one or more rectangular features in the source shape, wherein at least one of the rectangular features in the first set is 2×2 pixels or larger;
    calculating a source feature vector based on pixel value sums of the rectangular features in the first set;
    selecting a target shape from a target image, wherein the target shape contains p pixels;
    selecting a second set of one or more rectangular features in the target shape based on the rectangular features in the first set;
    calculating a target feature vector based on pixel value sums of the rectangular features in the second set;
    determining that a difference between the source feature vector and the target feature vector is below an error threshold; and
    based on the difference between the source feature vector and the target feature vector being below the error threshold, determining a mapping between the source image and the target image and applying the mapping to one of the source image and the target image to produce a transformed image.

2. The method of claim 1, wherein selecting the source shape from the source image comprises:
    based on one or more pixel values of each of the p pixels in the source shape, calculating a variance metric for the source shape;
    determining that the variance metric meets a variance threshold; and
    based on the variance metric meeting the variance threshold, selecting the source shape.

3. The method of claim 1, wherein the source shape is an m×n rectangle, and wherein m×n=p, the method further comprising:
    constructing a source summed area table (SAT) for the source shape, wherein the source SAT contains m×n entries, wherein calculating the source feature vector is based on the source SAT.

4. The method of claim 3, wherein the source SAT takes the form of an m×n rectangle, and wherein constructing the source SAT for the source shape comprises:
    for each respective entry (i, j) of the source shape, determining a respective sum of pixels in a sub-rectangle defined by an upper-left-hand corner (0, 0) of the source shape and a lower-right-hand corner (i, j) of the source shape; and
    writing the respective sum in the respective entry (i, j) of the source SAT.

5. The method of claim 1, wherein determining that the difference between the source feature vector and the target feature vector is below the error threshold comprises calculating a respective error value between each respective entry (k) of the source feature vector and respective entry (k) of the target feature vector.

6. The method of claim 1, wherein determining the mapping between the source image and the target image comprises determining an offset between the source shape and the target shape.

7. The method of claim 6, wherein applying the mapping to one of the source image and the target image comprises applying one of an affine transform and a homography transform to one of the source image and the target image using the offset between the source shape and the target shape.

8. The method of claim 1, further comprising:
    before selecting the source shape from the source image, receiving the source image and the target image from a client device; and
    after applying the mapping to one of the source image and the target image, transmitting an indication to the client device, wherein the indication provides a reference to media based on the transformed image.

9. The method of claim 1, wherein selecting the target shape comprises:
    downsampling the source shape to form a downsampled source shape;
    downsampling the target shape to form a downsampled target shape;
    determining that an alignment difference between the downsampled source shape and the downsampled target shape is below an alignment threshold; and
    selecting the target shape based on the alignment difference being below the alignment threshold.

10. The method of claim 9, wherein determining that the alignment difference between the downsampled source shape and the downsampled target shape is below the alignment threshold comprises:
    constructing a source summed area table (SAT) for the downsampled source shape and a target summed area table (SAT) for the downsampled target shape;
    based on the source SAT, calculating a source downsampled feature vector;
    based on the target SAT, calculating a target downsampled feature vector; and
    determining that the alignment difference is below the alignment threshold based on a comparison of the source downsampled feature vector to the target downsampled feature vector.

11. An article of manufacture including a non-transitory computer-readable storage medium, having stored thereon program instructions that, upon execution by a computing device, cause the computing device to perform operations comprising:
    selecting a source shape from a source image, wherein the source shape contains p>4 pixels;
    selecting a first set of one or more rectangular features in the source shape, wherein at least one of the rectangular features in the first set is 2×2 pixels or larger;
    calculating a source feature vector based on pixel value sums of the rectangular features in the first set;

selecting a target shape from a target image, wherein the target shape contains p pixels;

selecting a second set of one or more rectangular features in the target shape based on the rectangular features in the first set;

calculating a target feature vector based on pixel value sums of the rectangular features in the second set;

determining that a difference between the source feature vector and the target feature vector is below an error threshold; and based on the difference between the source feature vector and the target feature vector being below the error threshold, determining a mapping between the source image and the target image and applying the mapping to one of the source image and the target image to produce a transformed image.

12. The article of manufacture of claim 11, wherein selecting the source shape from the source image comprises:

based on one or more pixel values of each of the p pixels in the source shape, calculating a variance metric for the source shape;

determining that the variance metric meets a variance threshold; and based on the variance metric meeting the variance threshold, selecting the source shape.

13. The article of manufacture of claim 11, wherein the source shape is an m×n rectangle, and wherein m×n=p, the operations further comprising:

constructing a source summed area table (SAT) for the source shape, wherein the source SAT contains m×n entries, wherein calculating the source feature vector is based on the source SAT.

14. The article of manufacture of claim 13, wherein the source SAT takes the form of an m×n rectangle, and wherein constructing the source SAT for the source shape comprises:

for each respective entry (i, j) of the source shape, determining a respective sum of pixels in a sub-rectangle defined by an upper-left-hand corner (0, 0) of the source shape and a lower-right-hand corner (i, j) of the source shape; and writing the respective sum in the respective entry (i, j) of the source SAT.

15. The article of manufacture of claim 11, wherein determining that the difference between the source feature vector and the target feature vector is below the error threshold comprises calculating a respective error value between each respective entry (k) of the source feature vector and respective entry (k) of the target feature vector.

16. The article of manufacture of claim 11, wherein determining the mapping between the source image and the target image comprises determining an offset between the source shape and the target shape.

17. The article of manufacture of claim 16, wherein applying the mapping to one of the source image and the target image comprises applying one of an affine transform and a homography transform to one of the source image and the target image using the offset between the source shape and the target shape.

18. The article of manufacture of claim 11, the operations further comprising:

before selecting the source shape from the source image, receiving the source image and the target image from a client device; and after applying the mapping to one of the source image and the target image, transmitting an indication to the client device, wherein the indication provides a reference to media based on the transformed image.

19. The article of manufacture of claim 11, wherein selecting the target shape comprises:

downsampling the source shape to form a downsampled source shape;

downsampling the target shape to form a downsampled target shape;

determining that an alignment difference between the downsampled source shape and the downsampled target shape is below an alignment threshold; and selecting the target shape based on the alignment difference being below the alignment threshold.

20. The article of manufacture of claim 19, wherein determining that the alignment difference between the downsampled source shape and the downsampled target shape is below the alignment threshold comprises:

constructing a source summed area table (SAT) for the downsampled source shape and a target summed area table (SAT) for the downsampled target shape;

based on the source SAT, calculating a source downsampled feature vector;

based on the target SAT, calculating a target downsampled feature vector; and determining that the alignment difference is below the alignment threshold based on a comparison of the source downsampled feature vector to the target downsampled feature vector.

* * * * *